(12) United States Patent
Manifold

(10) Patent No.: US 7,394,981 B2
(45) Date of Patent: Jul. 1, 2008

(54) OPTICAL COMMUNICATION MANAGEMENT SYSTEMS

(76) Inventor: Robert H. Manifold, 274 Quasset Rd., Pomfret Center, CT (US) 06259-1122

( * ) Notice: Subject to any disclaimer, the term of this patent is extended or adjusted under 35 U.S.C. 154(b) by 794 days.

(21) Appl. No.: 10/400,164

(22) Filed: Mar. 25, 2003

(65) Prior Publication Data

US 2003/0215236 A1 Nov. 20, 2003

Related U.S. Application Data

(60) Provisional application No. 60/368,784, filed on Mar. 28, 2002.

(51) Int. Cl.
*H04B 10/08* (2006.01)
*H04J 14/00* (2006.01)

(52) U.S. Cl. ............... 398/17; 398/31; 398/33; 398/34; 398/67; 398/68

(58) Field of Classification Search ............ 398/9–14, 398/17–20, 22, 31–34
See application file for complete search history.

(56) References Cited

U.S. PATENT DOCUMENTS

| | | | |
|---|---|---|---|
| 4,911,515 A | 3/1990 | So et al. | |
| 5,113,459 A | 5/1992 | Grasso et al. | |
| 5,296,956 A | 3/1994 | Fatehi et al. | |
| 5,367,394 A | 11/1994 | Chuter et al. | |
| 5,416,623 A | 5/1995 | Dawson et al. | |
| 5,500,756 A | 3/1996 | Tsushima et al. | |
| 5,513,029 A | 4/1996 | Roberts | |
| 5,523,868 A | 6/1996 | Hawley | |
| 5,757,526 A | 5/1998 | Shiragaki et al. | |
| 5,793,909 A | 8/1998 | Leone et al. | |
| 5,956,165 A | 9/1999 | Fee et al. | |
| 6,005,696 A | 12/1999 | Joline et al. | |
| 6,263,136 B1 | 7/2001 | Jennings et al. | |
| 6,313,932 B1 * | 11/2001 | Roberts et al. | 398/9 |
| 6,317,535 B1 | 11/2001 | Jennings et al. | |
| 6,335,810 B1 | 1/2002 | Uehara | |
| 6,366,724 B1 | 4/2002 | Jennings et al. | |
| 6,433,903 B1 * | 8/2002 | Barry et al. | 398/79 |

(Continued)

FOREIGN PATENT DOCUMENTS

EP 0 777 345 A2 6/1997

(Continued)

OTHER PUBLICATIONS

McLaughlin, M., "Optical Signaling and Control Opening the Door to New Ways of Building Networks," *Optical Networks Magazine*, pp. 8, 10, 11, (Sep. 2001).

(Continued)

*Primary Examiner*—Dalzid Singh
(74) *Attorney, Agent, or Firm*—Hamilton, Brook, Smith & Reynolds, P.C.

(57) ABSTRACT

An optical medium, whether inside or outside an internet/telecommunications backbone, is managed using a management signal at a wavelength which is distinct from wavelengths of service signals. A multiplexer multiplexes the management signal onto the optical medium, after which a demultiplexer demultiplexes the management signal for analysis. Performance of customer channels may be inferred from performance of the management signal.

53 Claims, 14 Drawing Sheets

U.S. PATENT DOCUMENTS

| | | |
|---|---|---|
| 6,490,063 B1 | 12/2002 | Imajo |
| 6,498,663 B1 | 12/2002 | Farhan et al. |
| 6,621,621 B1 * | 9/2003 | Jones et al. ............ 359/337.11 |
| 2002/0041409 A1 | 4/2002 | Laham et al. |
| 2002/0138796 A1 | 9/2002 | Jacob |
| 2002/0176129 A1 | 11/2002 | Dinu et al. |
| 2003/0035171 A1 | 2/2003 | Touma |
| 2003/0067655 A1 * | 4/2003 | Pedersen et al. ............ 359/152 |
| 2004/0228628 A1 * | 11/2004 | Richards et al. ............... 398/16 |

FOREIGN PATENT DOCUMENTS

| | | |
|---|---|---|
| EP | 0 964 487 A1 | 12/1999 |
| EP | 1 039 670 A2 | 9/2000 |
| GB | 2 374 758 A | 10/2002 |
| WO | WO 02/21746 A2 | 3/2002 |

OTHER PUBLICATIONS

McGuire, A., "Management of Optical Transport Networks," *Electronics & Communication Engineering Journal*, 11: 155-163 (Jun. 1999).

* cited by examiner

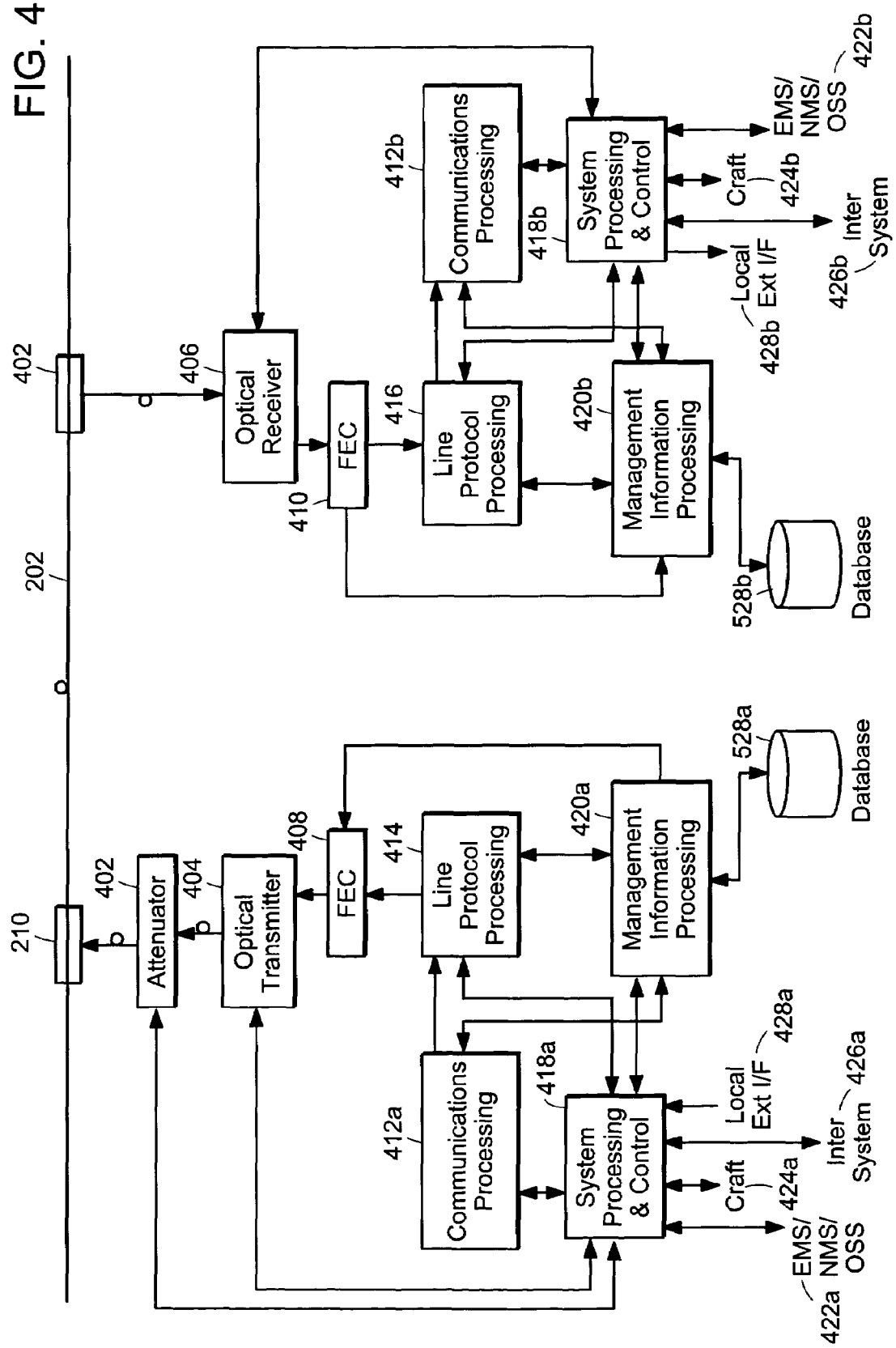

OPTICAL COMMUNICATION MANAGEMENT SYSTEMS

RELATED APPLICATION

This application claims the benefit of U.S. Provisional Application No. 60/368,784, filed Mar. 28, 2002. The entire teachings of the above application are incorporated herein by reference.

BACKGROUND OF THE INVENTION

A telecommunications network can be viewed as consisting of three main sections: the backbone network, the metro network and the access network. The backbone network connects major switching centers typically located in major cities. The metro network connects a backbone switching center to smaller switching centers located within a metropolitan area, i.e. within a city. The access network connects end user customers to the switching centers of the metro network.

In the backbone the traffic of tens of thousands to millions of customers is aggregated (multiplexed) onto the optical transport equipment that forms the interconnections between switching centers. The cost per customer traffic flow is therefore low due to the amortization of the high equipment costs across the large number of flows. The metro network carries the traffic of hundreds to thousands of customers. The cost per customer flow is higher than in the backbone because the cost of the transport equipment is amortized over a smaller number of flows. The access network connects a very small number of customers or often a single customer to the metro switching centers. The transport equipment used to make these customer connections is typically the same as that used in the metro network. The cost of the access transport is thus amortized over a small number or single customer traffic flow.

The dominant optical transport technology is Synchronous Optical Networking (SONET) in North America, or Synchronous Digital Hierarchy (SDH) elsewhere. The service providers who operate these networks have operational support systems (OSS) that are used to provision, monitor, diagnose and control their transport network. These OSS systems range in size or complexity dependant upon the operators environment, ranging from individual element manager systems addressing one or more of the major management disciplines—Fault, Configuration, Accounting, Performance, Security—(FCAPS), to highly integrated systems providing tight coupling and interdependence across these roles. These OSS systems are designed to use familiar, consistent data retrieved and recorded from the transport network, predominantly based on standard SONET/SDH metrics. Equipment that does not provide performance data in the formats required by these OSS, and hence does not readily integrate, represents an added cost to the service providers.

SUMMARY OF THE INVENTION

The systems described herein address both the capital costs (CAPEX) and the operational costs (OPEX) of provisioning optically based services to those enterprise (business) customers that require sufficient bandwidth to require optical fiber connections.

Costs of providing optically delivered services to enterprise customers can be reduced; i) by separating the optical transport function from the optical service being delivered over the optical medium; ii) by simplifying the optical transport equipment required at the central office (CO) and at the customer premise; and iii) by interfacing to the OSS systems in the same way as the existing transport equipment.

Additional operational functionality which may also be provided include; i) the ability to provide loopback testing of the optical connection without interrupting the service delivery; ii) the ability to continuously (or intermittently) monitor the optical connection and raise an alarm if the connection is compromised by unwelcome interdiction; iii) the ability to establish a communications channel across the medium separate from the optical channel carrying the service; and iv) the ability to establish a management control plane across any topology.

The disclosed system can operate in a variety of different network topologies such as; i) point to point direct connections, ii) complex mesh networks, and iii) ring networks Optical fiber facilities delivering communications services may be managed and monitored using an optical medium management signal (OMMS) at a wavelength which is distinct from wavelengths used for the delivery of services. An optical multiplexer multiplexes the OMMS onto the optical medium with the customers' optical service signal. After the OMMS traverses the optical medium, a demultiplexer removes the OMMS for demodulation and processing. Availability, performance and other operational metrics of the communications service wavelengths across the optical medium may be inferred from the operation, availability and performance of the OMMS carried on the management wavelength. For example, if the OMMS detects a large number of errors after passing through the optical medium, it may be an indication of problems with the medium and may be taken to indicate a large number of errors in service signals as well.

The OMMS is sent out across the optical medium by an optical jack at one end of an optical medium, and is also received by an optical jack, whether the same one, or an optical jack at another point on the optical medium. The use of optical jack system is not limited to a single fiber or a two fiber connection. Optical jacks may be used anywhere in a general network topology, interacting with each other and with overall network management services. Typically, although not exclusively, pairs of fiber optic strands are the preferred method for delivery of optical services, with one fiber acting as a transmit medium and the other as a receive medium. In this embodiment each optical demarcation jack on the optical span might provide both the modulation and multiplexing of an OMMS onto one fiber and the demultiplexing and demodulation of an OMMS from the other fiber, providing management and monitoring of both fiber strands. Alternatively, a single fiber broadcast service where only a transmit fiber is provided between end points could be envisioned. In this embodiment each optical jack might either provide both modulation and multiplexing of the OMMS onto the fiber, or the demultiplexing and demodulation of an OMMS at the other end of the single fiber Typical service signals used in optical fiber transmission are in one of the three distinct wavebands: Nominally 850 nm, 1200 nm-1400 nm and 1470 nm-1610 nm. The OMMS may be in a different waveband from the service signals. Alternatively, the OMMS may be in the same waveband as the service signals to better reflect the quality of service delivered in that waveband. The wavelength of the OMMS may be fixed within the design of the optical jack, or the optical jack may have optical components capable of being set to generate and multiplex signals at different wavelengths.

The protocol carried on the OMMS may provide detailed performance metrics such as, but not exclusively, received signal strength, quality, framing status, error rates, CRC errors, transmission block errors and other media and protocol specific metrics which are relevant to the state and performance of the optical medium.

In the majority of current optical network connections SONET (Synchronous Optical Network), and its international equivalent SDH (Synchronous Digital Hierarchy), (Sonet/SDH) line protocols provide a structured set of alarms, status and performance metrics relating to optical line systems that are well known and understood by network operations personnel and tightly integrated into the OSS. In the preferred embodiment, a standard SONET/SDH formatted optical medium management signal, modulated and multiplexed onto the optical medium, is used, providing a consistent set of known and understood metrics relevant to the optical medium independent of the format or protocols of the delivered service across that optical medium. In alternative embodiments other standard or proprietary optical line protocols may be used to achieve the same or similar capabilities as required or defined by the OSS environment.

The OMMS protocol will typically include a payload, or allocated bytes and/or bits within the defined protocol structure for end to end data communications. Where this communications capability exists within the OMMS it may be used to provide inter unit communications between processors and applications running on the optical demarcation jacks across the optical medium. This communication path between optical jacks may be used to provide an operational management and control plane, enabling any applications running on individual optical jacks to be accessed and controlled from any point in the network and for management information to be exchanged from any optical jack to another or to any higher order OSS.

Typically the OMMS will be multiplexed across the optical medium with the same directionality as the optical service, i.e. both multiplexed signals traverse the optical medium in the same direction. For additional diagnosis, the OMMS may be driven in opposite direction to the optical service signals.

In some situations an optical jack may be instructed to attenuate the optical medium management signal. The attenuation may be accomplished by reducing the optical launch power of the optical transmitter or by using an optical attenuator prior to the OMMS being multiplexed onto the optical medium. The OMMS is attenuated independent of the service signals to operate near or at a level where further attenuation or impairments of the optical medium end to end would significantly impact the errors incurred in demodulation and hence measured by the receiving optical jack.

A forward error correcting protocol may also be implemented across the OMMS path between optical jacks to ensure that end to end communications can be maintained even though the optical path is incurring errors. The error correction protocol would provide additional management information relative to error counts to complement those metrics available from the error detection inherent in the optical medium management signal. These modes of operation provide greater sensitivity to changes in the optical characteristics of the optical medium.

Management information on performance, errors, alarms, status, diagnostics etc, generated in a known and understood form from the optical jack local processing or collected remotely from other optical jacks, may then be recorded in a database located at the optical jack or forwarded to a optical jack control shelf where additional storage, processing and forwarding of relevant information to higher order network management or operational support systems can be completed. By recording and processing performance statistics in these databases, it is possible to identify trends and anomalies and predict future performance of the optical medium and the transported optical services, pre-emptively anticipating service affecting problems.

The optical demarcation jack may include external interfaces to provide operationally important functions to remote locations for items such as monitoring or activating NC/NO contacts, reporting remote battery voltages, temperature, humidity or access alarms, or providing remote equipment management and remote technician Ethernet access, etc. A communications network overlaid on the OMMS communications paths may be used to communicate such site-specific information from one place to another over a management and control plane established on this network.

Typically, managing the optical medium using the OMMS does not affect the service signals at all, and the service is uninterrupted. However, in an alternative embodiment of the invention, the optical jack may also include programmable components, monitoring and analyzing specific services transmitted on service signals.

In general, the optical jack system may be used to manage optical media delivering service connections, as well as to light up "dark fiber", that is, to manage fiber currently not carrying service signals on behalf of the owner of the fiber facility, but made available to other parties to pass their own signals from one point to another in a network. The agnostic qualities of the optical demarcation point hence allow any format signal to be passed with no service specific requirements on the owner of the facility but with the ability to provide management, and if required, pro-active support services to the users of the facilities.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a diagram of a single fiber network connection with management and analysis electronics at the demarcation jack;

DETAILED DESCRIPTION OF THE INVENTION

A description of preferred embodiments of the invention follows.

Figure 1:
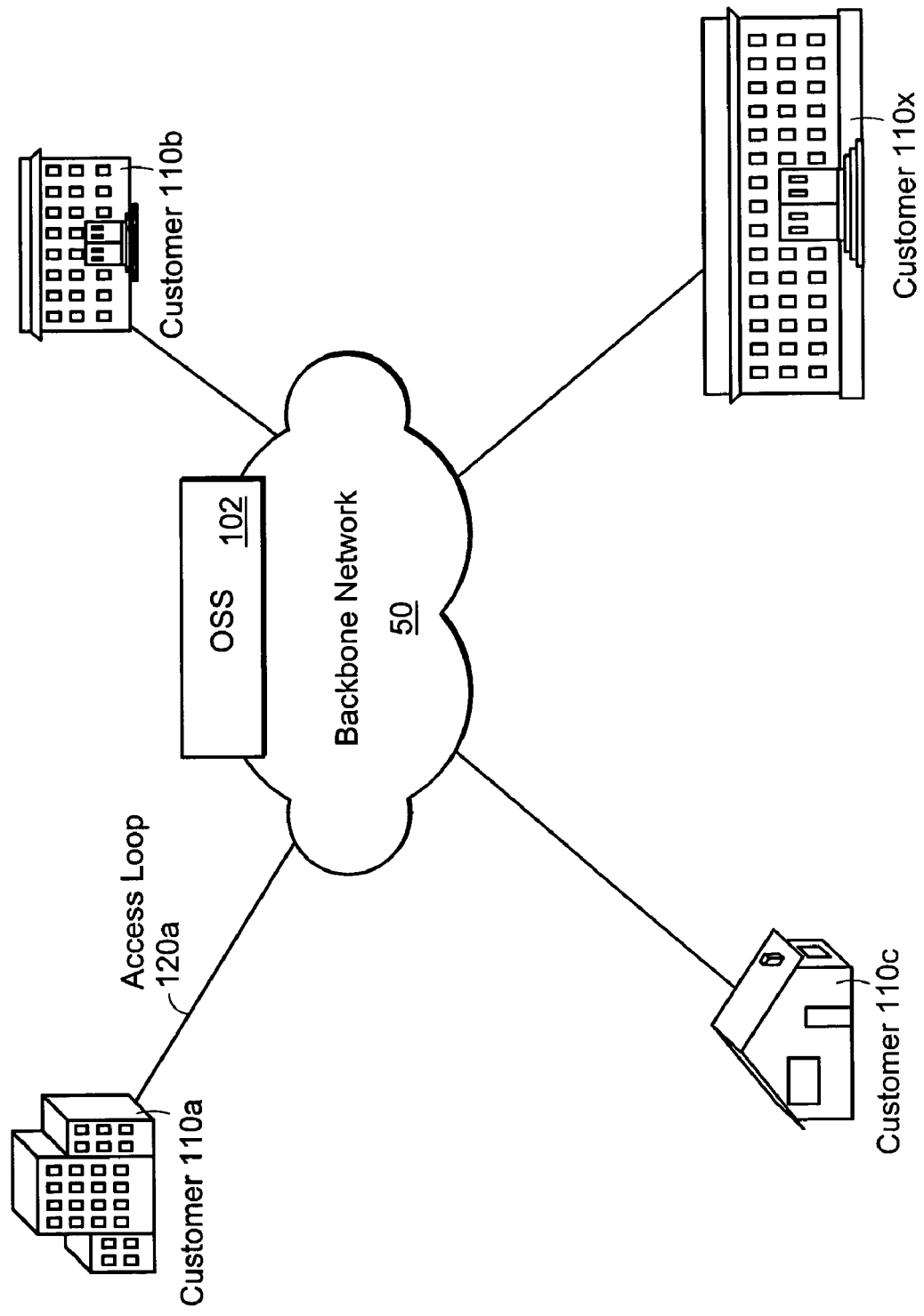
FIG. 1 is schematic diagram of a general optical networking environment.

FIG. 1 is a schematic diagram of a general optical networking environment. Backbone network 50 is a web of tightly coupled predominantly fiber-based networks, with well-orchestrated points of hand-off between various backbone providers, telecommunication companies, and other parties. The operation of backbone network 50 is typically overseen by Operation Support Systems (OSS) 102, providing visibility into the network for Network Operation Centers (NOC's), central office (CO) technicians, and a range of planning and business processes requiring status and use of information relating to the network. The OSS in support of NOC's within operational networks are typically mission-critical, in that they are required to provide responses within minutes or even seconds of a network interruption. Such response may include re-routing or cutting back on traffic, attempting repair of the faulty point, or at least reporting the fault to parties responsible for fixing the point of failure. Other OSS, although not critical to maintaining the integrity of the network, are as equally important to be updated for any changes that may happen, such as accounting systems administrating service level agreements where availability or error free performance of a service over time is a key metric to be applied. The systems are well-tested and require minimum downtime, and, while they may not be the state of the art in terms of technical specifications, they provide a tightly woven infrastructure to operate and administer networks and their facilities. Hence, telecommunication companies would generally prefer to maintain these systems for most of the fiber based services, rather than to have to invest in separate management and maintenance system for each service provided.

Network performance is measured in a variety of schemes, defined by standards, whether general, or proprietary. Synchronous Optical Network (SONET) is one such standard for optical telecommunications transport and management. Synchronous Digital Hierarchy (SDH) is a counterpart standard to SONET used outside of North America. SONET/SDH performance and availability metrics may be used to measure and analyze performance of optical connections, and most established OSS systems are usually well-adapted to work with such metrics in the backbone and access networks.

Optical service providers may prefer to retain control over customer access loops 120a-x in order to be able to detect and diagnose points of failure, as well as to be able to correctly bill and administer SLA's. If visibility and control over customer access lines is unavailable due to deployment of transport systems incompatible with OSS or even completely lacking any management capabilities, optical service providers may experience a so-called "black hole" problem, where performance impairments of the fiber optic access line are not reported, discovered or diagnosed promptly by the service provider's OSS. For example, in the case of a broken fiber in an unmanaged access loop, the service provider would not be able to diagnose it accurately because, to the service provider, the situation would be indistinguishable from one where the customer equipment is faulty. Meanwhile, the customer would not have resources to diagnose or repair the failure because the customer would not have physical control of the fiber, and because to them the situation might be indistinguishable from a fault on the service provider side. The usual response to this situation is a costly 'truck roll' with a field technician dispatched to test and confirm the integrity and performance of the fiber facility to the customer location. Typically, this situation is unacceptable to all service providers and most customers who expect prompt, if not predictive, detection of problems and rapid restoration of service.

Therefore, the service provider needs to retain control over the customer end of the fiber in order to maintain and manage the access line. A point where the service provider hands off responsibility to the customer is called a demarcation point. Any failure beyond the demarcation point is the customer's responsibility, while the service provider is responsible for the connection up to the demarcation point. By positioning equipment controlled by the service provider at the demarcation point, the service provider retains control over both transmit and receive fibers and the centrally located (NOC or CO) service provider technicians can access the equipment for monitoring and diagnostics in cases of failure. Typically, a customer might call in to report a problem, and a technician may attempt to send instructions to the demarcation point equipment. If the equipment replies with proper responses, the technician may conclude that the problem is, indeed, on the customer end. If, however, the results of the test instructions do not comply with what is expected, the service provider retains the responsibility of fixing the connection.

Another consideration is that customers would like to have a range of alternative services delivered over the fiber optic lines. It would be feasible to provide the service-specific hardware at the central office, but then all new service-specific hardware must be designed to manage the demarcation point at the opposite end of the access line. In typical practice, to provide the service in combination with the conventional line equipment, service provider service specific equipment is overlaid on the legacy access systems with a new service demarcation point provided on the tributary (customer facing) side of that platform. This scenario, although currently used due to lack of alternatives, is not preferred due to significantly higher costs associated with the capital and operational costs involved (CAPEX & OPEX).

Typical existing access line equipment is analogous to what is used inside the backbone. Such equipment is operationally rich in features, with comprehensive management capabilities but expensive and complex. Unlike the backbone, however, the fiber optic lines are not used to their maximum, and the full capabilities of the equipment may end up being largely unused, while the customer is left to bear the full costs of this under-utilized infrastructure in the price paid for the services.

Thus, there is a divergence between the customer's demand for alternative, attractively priced, often state-of-the art services, and optical service providers' need for higher margins through lower cost, easier to provide and maintain access regardless of the services delivered over them. A solution offered by the disclosed system allows services to be defined at the central office, yet allows service-agnostic management of access optical fibers and that will provide infrastructure information and statistics to the service providers in a format easily understood and processed by the OSS and operational personnel.

Decoupling the management infrastructure from service allows for optimization of the infrastructure without limiting the services delivered. It is possible to reduce costs and simplify maintenance by providing service-agnostic management systems.

Easy adaptability of the preferred embodiment OMMS format: from SONET/SDH, to another, possibly proprietary standard provides an additional benefit.

Figure 2:
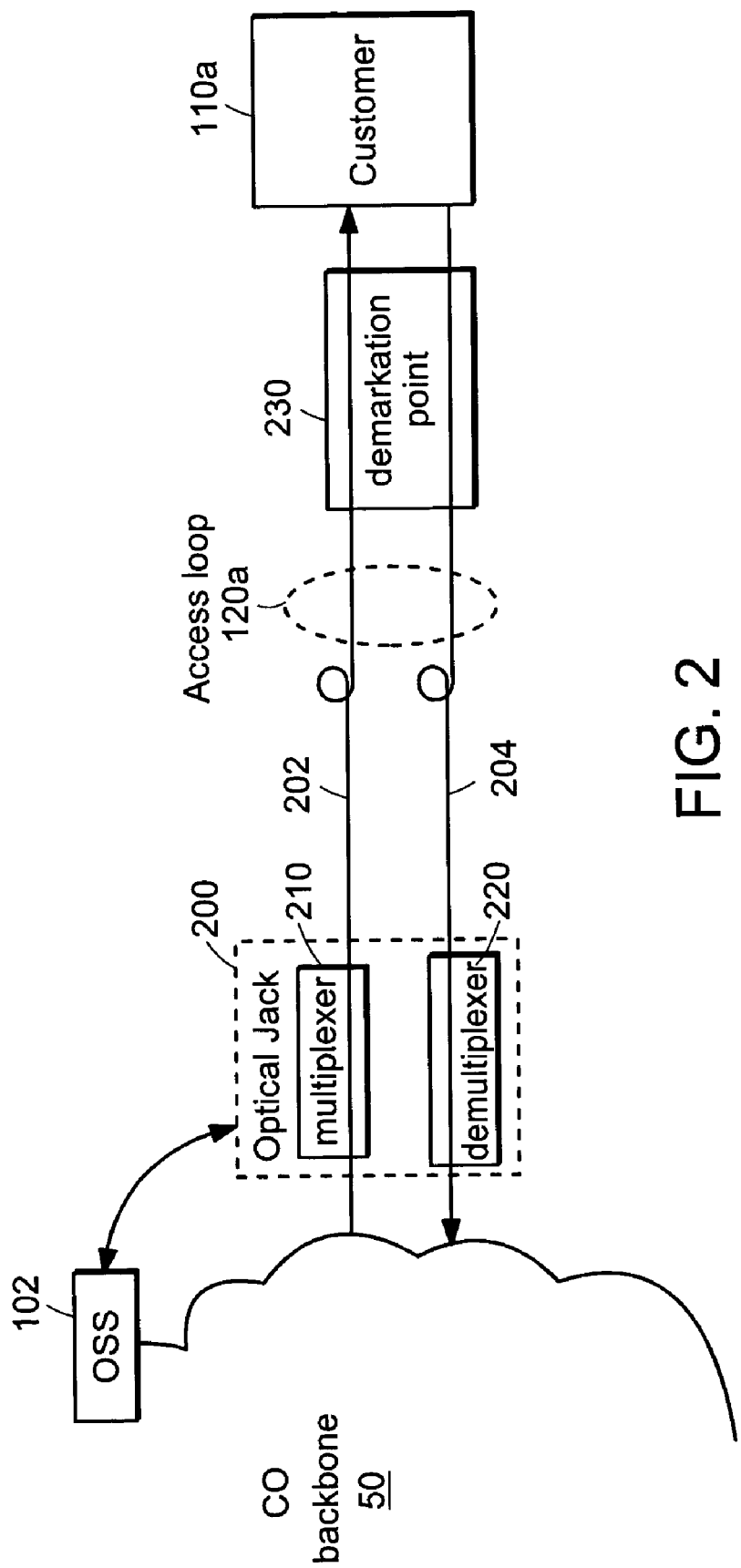
FIG. 2 is a diagram of networking between a control jack and a demarcation jack.

FIG. 2 is a schematic diagram of an optical jack networking system. The term "optical jack" is used herein to refer to a device for managing, monitoring and analyzing optical facilities. An optical jack located at a customer demarcation point is referred to as a "demarcation jack" herein, while an optical jack located at the service provider central office (CO) is referred to as a "control jack." It should be understood that this terminology is adapted merely for convenience, and does not imply that a type of a demarcation jack described cannot be installed in a service provider's location, or even that such a system is only applicable to customer access lines. The optical jack system may be used with any fiber installation, whether completely inside, or crossing the edge of the backbone 50, or in an entirely non-backbone to non-backbone connection.

The structure of the OMMS and the management information that can be directly obtained from processing the received signal or by further analyzing results over time are significant in providing complimentary operational value to services being delivered over the optical media. In the preferred embodiment of this invention the OMMS is SONET/SDH formatted running at a standard OC-n/STM-n line rate. In addition to the well known and understood performance monitoring and error detection provided over an optical span by Sonet/SDH, other bits of the overhead are available as communication channels to applications at either end. Also significant payload capacity is typically available, again providing either high bandwidth clear channels or multiple 51 Mbps individual channels across the medium. These significant alternative communications paths may be used to provide many operationally supportive applications as outlined in the following figures. A major benefit of using a standard optical line protocol is that the line specific management metrics are provided natively by the line termination processors, requiring minimal processing before data basing, reducing the protocol processing requirements within the optical jacks allowing the optical jacks to collect, collate and process the raw data within the optical jack and provide meaningful management information to even a local craft interface. Alternative embodiments may use other optical line protocols to achieve similar or more specific capabilities. A practitioner of the art will be able to provide many other operator specific solutions as required.

As shown in FIG. 2, access loop 120a may consist of two optical fibers: fiber 202 carrying signals from CO 250 to customer site 110a, and fiber 204 carrying signals in the opposite direction. Control jack 200 may consist, among other things, of a multiplexer 210, multiplexing an OMMS onto fiber 202. The OMMS may then be demultiplexed and possibly processed at demarcation jack 230, with the same or a newly formatted OMMS re-multiplexed onto the return fiber 204 to be demultiplexed at the de-multiplex 220 and processed in control jack 200. Analyzing the OMMS provides an insight into the state of the optical connection. For example, the OMMS that has passed through the optical medium may be analyzed for number of errors, degradation of signal, loss of signal, and other metrics. Such metrics may be those derived from optical line protocols such as SONET/SDH or other optical line protocols if utilized, or from measurement and analysis of applications running across the OMMS payload. If the OMMS reports errors after passing through the optical medium, it represents a degraded state of the optical medium itself and similar error rates may be inferred for customer channels traveling over the same medium.

The OMMS is modulated into a wavelength distinct from wavelengths used by the service, or services, being delivered to the customer. It is multiplexed using Wave Division Multiplexing (WDM) onto the fiber along with wavelengths carrying customer and CO data. In such a way, customer wavelengths remain unaffected, while effective measurement may be made of the state of the connection. Customer wavelengths may carry various services—such as, for example, Gigabit Ethernet, FiberChannel, or video. The management capabilities of the optical jacks are service agnostic in that no service adaptation is necessary—the services travel over wavelengths natively, not affected by the optical medium management signal, traveling on a separate wavelength.

Control jack 200 may communicate with higher order service provider OSS such as, for example, with OSS 102, in order to report results of managing, including monitoring and diagnosing, the optical medium. While control jack 200 is shown in FIG. 2 to contain both multiplexer 210 and demultiplexer 220, it should be understood that the presence of both is not required, and an optical jack may comprise solely a multiplexer or demultiplexer with any associated management processing. In the preferred embodiment of the invention, both multiplexers and electronics for generating and analyzing optical medium management signals are implemented in the same hardware, while in an alternative embodiment, they are separate components implemented in hardware and/or software, as determined by one skilled in the art.

Figure 3A:
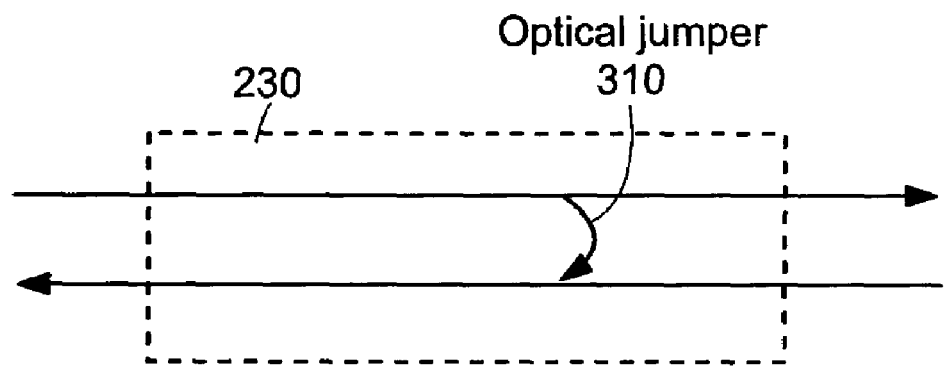
FIGS. 3a and 3b are diagrams of different implementations of demarcation jacks.
Figure 3B:
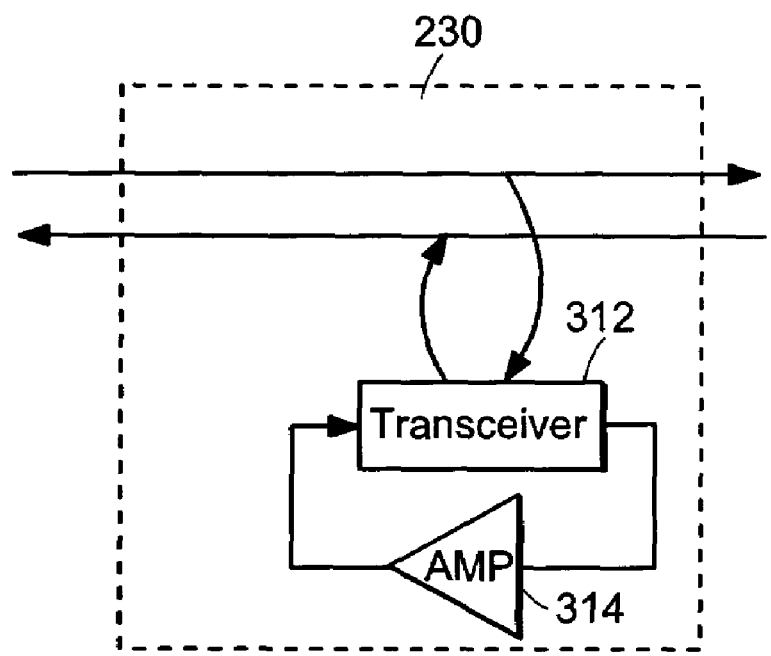

FIGS. 3a-b are schematic diagrams of different embodiments of demarcation jack 230. In one embodiment of the invention, demarcation jack may consist of an optical jumper connecting the output of the demultiplexer 220 to the input of the multiplexer 210, decoupling the OMMS from fiber 202 and multiplexing it onto fiber 204. In such a set up, no analysis of the OMMS is performed at the demarcation jack—instead, the control jack receives the OMMS back and performs analysis of the fiber pair forming an access loop, for example, by comparing the received OMMS to what was sent out. This is a true passive set up, with no amplification at the demarcation jack. In this set up the service provider has management visibility into the integrity of the medium from end to end of an optical loop pair and can detect errors or faults occurring in either fiber, without the need for additional equipment. This embodiment of the demarcation jack offers a very attractive solution in that it may be totally un-powered and requires little or no special environmental or security provisions at customer locations, as typically required for other current methods of providing optical demarcations.

Illustrated in FIG. 3b is an alternative embodiment of a demarcation jack 230, containing transceiver 312 and an amplifier 314 configured to repeat a received signal. The demultiplexed OMMS from fiber 202 is demodulated by transceiver 312 and is then passed to amplifier 314, which amplifies the signal prior to it being re-modulated by the transceiver and re-multiplexed onto the optical fiber 204. A practitioner skilled in the art may find this embodiment of the invention of particular use in long-distance loops where the capabilities of cost effective transceivers with a limited optical budget may be a limitation on the length of optical loops, and using the repeater 3b may allow for the length of the loop to be increased significantly.

FIG. 4 is a diagram of a single optical fiber connection with active management processing at both ends. Electronic processes have been simplified to major functional groupings with connectors indicating relationships and dependencies. Although indicative of practical functional interrelationships, a practitioner familiar with the art will be able to envisage many alternative hardware and software solutions to achieve similar functionality. Under control of the system processing and control 418a the line protocol processing, Sonet/SDH in the preferred embodiment, is instructed to output an OMMS at a particular signal rate to the optical transmitter 404. The transmitter 404 modulates the OMMS at a particular optical wavelength passing to the optical multiplexer 210. The multiplexer 210 optically couples the OMMS onto the fiber 202 towards the remote optical jack. At the receiving optical jack the demultiplexor 220 decouples the OMMS from the fiber 202 and passes it to an optical receiver 406. The optical receiver demodulates the OMMS and passes the resultant electronic signals to the receive line protocol processing 416. The OMMS line protocol is terminated providing performance and error metrics relative to the optical medium and providing access to both overhead and payload communications paths between the optical jacks. Management information is collected from the line protocol processing 416 by the management information processing functions 420 and stored in a local database 528. Information from the local database 528 may be further processed prior to forwarding via the system control 418b to the EMS/NMS/OSS interface 422 for delivery to either a higher order system or OSS for collection and further processing, or made available to other external craft 424 or intersystem ports 426. Communications paths derived from the OMMS are connected to the communications processing functions 412b. Communications paths between communications processes 412a and 412b provide the ability for information to be sent from one end of the fiber to the other.

It should be noted that the direction of the OMMS need not be the same as the direction of the service signals. For example, it may be useful to drive a OMMS from the customer site to the service provider site on fiber 202 in order to indicate a fault that has occurred on the optical service transmit fiber 204. This counter-directionality may provide additional diagnostic insight to discover direction-dependent problems with the optical medium, or may be used to report problems with an optical medium transmitting an optical service directly to its associated transmitting port, thus removing the dependence on a return path for management information on another facility from the remote end to indicate problems with the transmit medium. This attribute of the preferred embodiment is of particular importance to management of single fiber broadcast services such as analog or digital video transmission.

In addition to managing the connection, optical jack systems may be used to perform further detailed monitoring by detecting changes in the physical properties of optical fiber. One of such properties is a dependence of bit error rates on received optical power of the signal. An attenuated signal is much more sensitive to changes in physical properties of the fiber: such a signal may be used to diagnose inconsistencies in the fiber which may pose a future problem, and in some implementations provide a methodology to monitor the physical security of the fiber.

Figure 15:
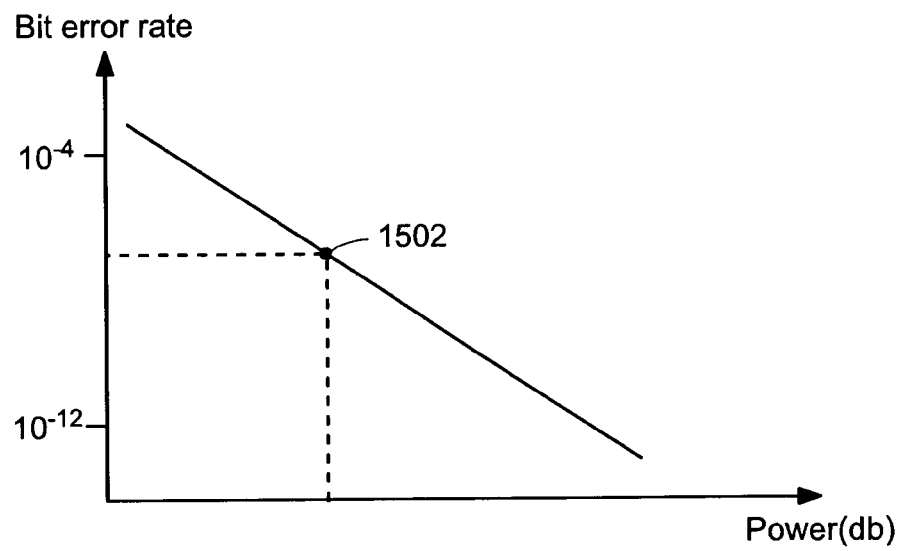
FIG. 15 is a graph of optical power vs. bit error rate of an optical signal.

FIG. 15 is a graph of optical power vs. bit error rate of an optical signal, expressed in a logarithmic scale. As optical power is attenuated, to lower power levels, bit error rates of the signal rise sharply. Normally an optical connection would operate in the range where bit error rate is sufficiently low, but power requirements are not prohibitively high—the so-called "optical operational envelope". However, additional analysis may be accomplished by operating the management wavelength at the lower power ranges of the optical envelope. Attenuation of the management signal may be achieved by varying the launch power of the optical transmitter 404 under the control of the system processing and control 418a or as illustrated in FIG. 4 by the use of an optical attenuator 402, again under the control of system processing and control.

In the preferred embodiment of the invention, management information is gathered, in particular error rates over time, while operating at a power level within the operational envelope close to the point where incremental errors would affect the received optical line protocol—for example, point 1502.

In this mode of operation, with the management channel attenuated to a point at or near the low power limit of acceptable operation, greater sensitivity to changes in the optical characteristics of the optical medium results, and hence the ability of lower speed management signals to emulate the greater sensitivity to impairments in the optical medium of services when operated at higher signal rates. When used in the preferred embodiment, these capabilities of the invention allow lower cost, lower speed optical transmitters, and lower cost, lower sensitivity optical receivers to manage services operating at far higher rates.

In another embodiment, valuable metrics on performance of the medium may be achieved by "scanning" different optical power levels and detecting and recording the bit error rates of the OMMS after it has passed through the optical medium at each of these levels. Recording and processing different error rates at different optical power levels may also be used in rates of change in the medium and in predicting mean time to failure or other metrics. Scanning may be performed periodically—for example, every 15 minutes.

In an alternative embodiment of the invention, scanning may be done constantly in order to better monitor the fiber. In yet another embodiment of the invention, multiple management wavelengths may be used, one used to diagnose normal operating conditions, and another to operate at attenuated optical power.

Also illustrated in FIG. 4 is forward error control (FEC) encoding 408 and decoding 410 processes. As described above, it may be desired to operate at a point or points within the optical operational envelope where increased errors, dependant upon the mode of operation, would be present at the receiving line protocol processing. During these periods of increased errors there is a potential for the protocol processing to be disrupted to a point where the end to end management signal path is lost with the consequential loss of error detection statistics, or the payload channels used for other applications and reporting could become unusable, effectively isolating an optical jack from its partner. FEC 408, 410 provides a method for the management signal to be maintained along with any associated applications present in the payload while operating at a point where errors would normally disrupt such connections. While FEC would maintain the connection and recover any errors in the management signal, hence masking the error detection inherent in the optical line protocol, it would also provide supplementary error detection metrics as a result of the FEC decoding 410 processes, augmenting the error performance management information normally available from the line protocol processing 416.

The correlation of bit error rates vs. received optical power while operating at particular wavelengths may be used to provide monitoring of the physical security of the fiber. If an intruder attempts to copy the signal, for example by tapping the optical medium, the received optical power level may be affected. During such monitoring, a small change in optical power may result in a large bit error rate change, thus indicating a change in the attributes of the optical medium requiring investigation or action to ensure integrity of the medium.

The optical jack system may be set up to record possible physical securities violations for future analysis, or to pass them to the OSS. In an alternative embodiment of the invention, an optical jack that detected physical security violation may affect service-carrying wavelengths by, for example, shutting off signals across that medium, or by inserting a warning message or by inserting a deliberately false message across the medium. A multiplicity of other configurations and applications are available, as well as understood by one skilled in the art.

In yet other embodiments of the invention, the demarcation jack may contain additional electronics for analyzing the OMMS or for inserting into the OMMS management information from the customer site (see FIGS. 5-10). As will be apparent to one skilled in the art, the demarcation jack may be implemented as identical to the control jack; these figures illustrate embodiments of the principals described in FIG. 4 for two fiber networks between two points.

Minor differences exist in the descriptors and connections between management processes between FIG. 4 and the following figures. A practitioner familiar with the art will be able to envisage many alternative hardware and software solutions to achieve similar required functionality. Transceiver 516 combines the functions of the optical transmitter 404 and optical receiver 406. Transmit logic 518, receive logic 520 and comparator 522 functions are collectively broadly analogous to line protocol processing 414 and 416. Control logic 526 is broadly analogous to combined system processing and control 418a and 418b and management information processing 420. Communications logic 526 is comparable to communications processing 412a and 412b.

Figure 5:
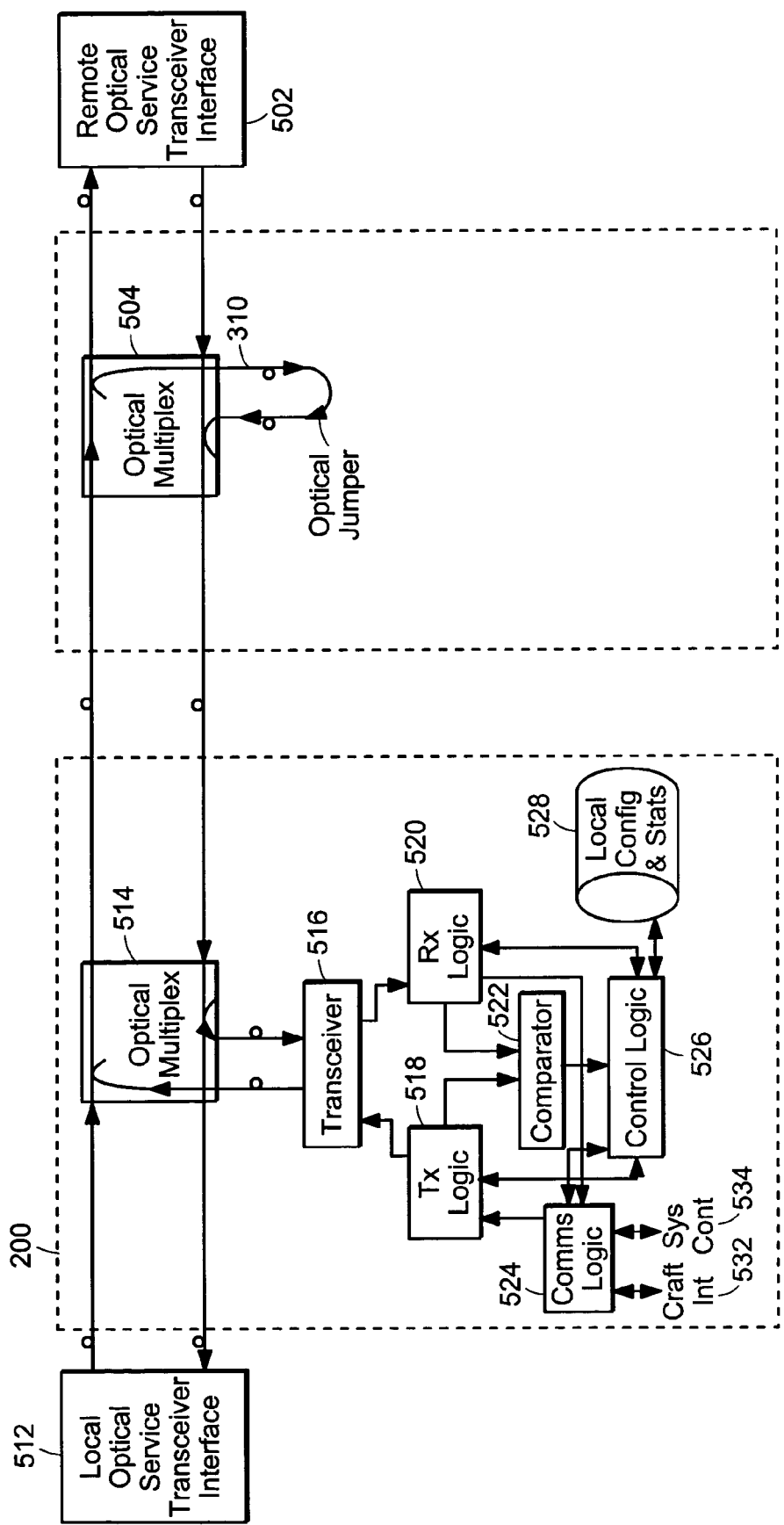
FIG. 5 is a diagram of two fiber network connection with a passive demarcation jack.

FIG. 5 is a diagram of a two fiber loop network connection with a passive demarcation jack. The control jack 20 contains an optical multiplexer 514 for multiplexing and demultiplexing the OMMS onto the fiber, and a transceiver 516 for transmitting and receiving the optical medium management signal. Transmitter logic 518 generates a line protocol for the optical medium management signal, to be transmitted by transceiver 516. Transceiver 516 converts the electrical signal from the transmitter logic 518 at a specified bit rate into a modulated optical signal at a specified wavelength (hereinafter referred to as "management wavelength" to indicate that it carries the optical medium management signal) which is then multiplexed with the primary service optical signal in the multiplexer 514.

The multiplexed wavelengths traverse the optical access span to the demarcation jack 230 where multiplexer 504 demultiplexes the management wavelength, containing the modulated optical medium management signal, from the primary optical signal service. The management wavelength is then optically looped back through the optical jumper 310 back to the multiplexer 504, which multiplexes it onto fiber 204.

The returned management wavelength is de-multiplexed by multiplexer 514 in the control jack 200 and is converted by transceiver 516 from the modulated OMMS into an electric signal. The resulting electrical signal containing the returned management protocol is passed on to the receiver logic 520.

Both transmitter logic and receiver logic pass copies of the protocols they, correspondingly, transmit and receive, to comparator 522. The comparator 522 identifies differences between transmitted and received protocols (if any), and indicates types and severity of differences to control logic 526. The control logic 526 may decide, based on the errors it is seeing, to increase or decrease the transmission rate, or to change the payload, or to send instructions to a receiving optical jack. In addition, information about the error rates and OMMS performance may be stored in local memory 528, to be later analyzed for possible prediction of time to failure or for calculation of error-over-time and other trends. Optical jack 200 may communicate with higher order system level electronics, EMS, NMS or OSS through system control port 534. A local craft port 532 provides direct technician access to the optical control jack management information.

In an alternative embodiment of the invention, optical jack 200 need not be implemented as shown—instead, the different logical processes 518, 520, 522, 524, 526, 528, 532 and 534 may be combined into fewer, or separated into multiple sub processes operating on the same or different optical jack. In yet another embodiment of the invention, control logic 526 may take on the role of comparing results of the received protocol to the ones received and stored in the database 528 earlier and later in time, in order to perform trend, statistical, probabilistic, or other types of analyses.

Meanwhile, it should be understood that communication between service provider transceiver interface 512 and remote transceiver interface 502 is in no way impeded by the WDM multiplexed management wavelength, and, in fact, the two transceiver interfaces 502 and 512 may not be aware of the overlaying optical jack system.

Figure 6:
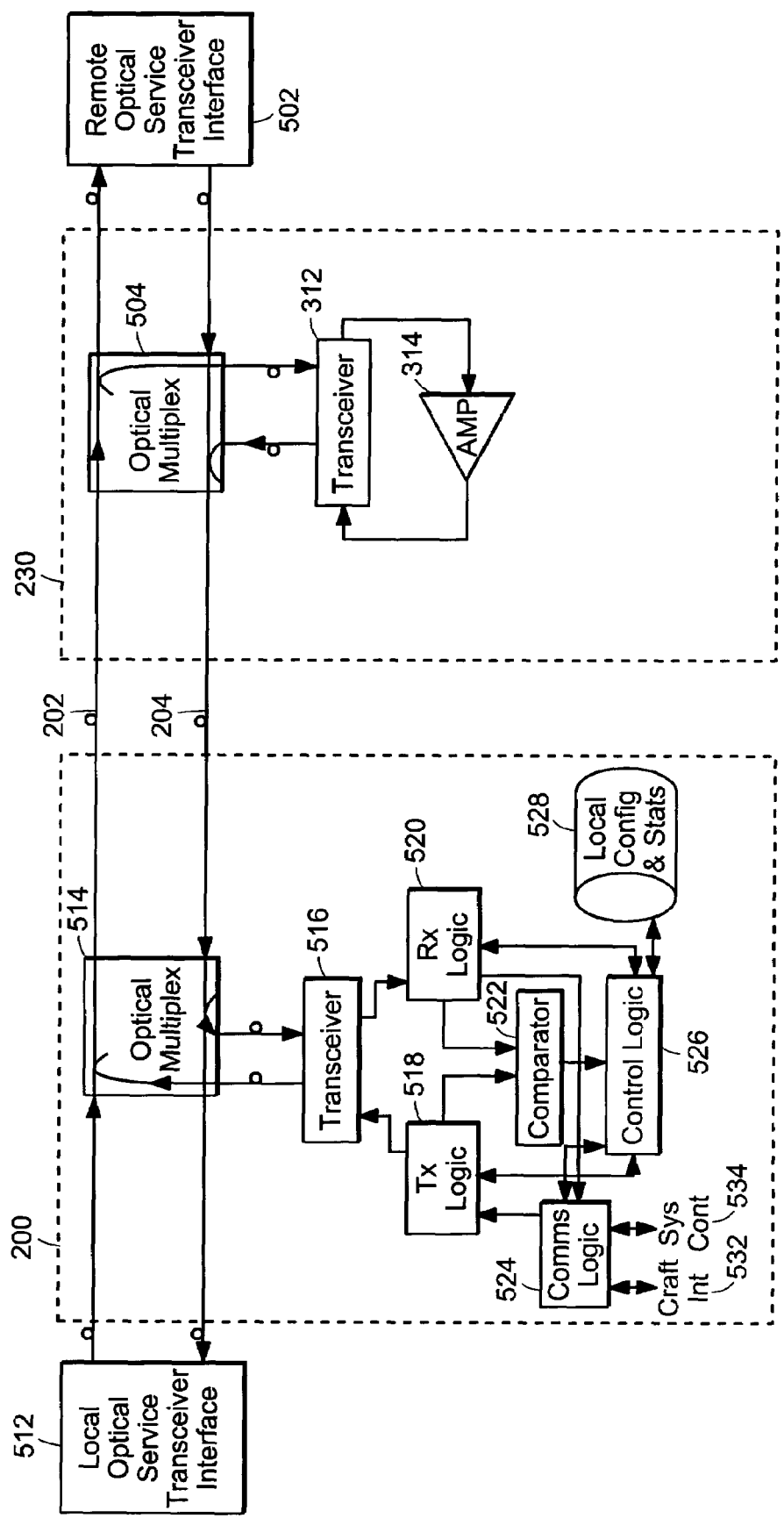
FIG. 6 is a diagram of a two fiber network connection with an amplifier at the demarcation jack.

FIG. 6 is a diagram of an optical loop network with a repeater function at the demarcation jack. This diagram is similar to what is shown in FIG. 5, with demarcation jack containing a transceiver 312 and an amplifier 314 (as also illustrated in FIG. 3b). Such a system may be useful in cases where the distance between the local and remote assemblies increases the losses of the returned OMMS beyond the operational specifications of the management signal optical transceiver.

At the demarcation jack the de-multiplexed management wavelength is passed to the receive optics of transceiver 312, where the modulated optical signal is converted to an electrical signal at a resultant bit rate. The resulting electrical signal is amplified in amplifier 314 to appropriate levels and passed to the transmit interface of transceiver 312.

Transceiver 312 modulates a specific wavelength with the signal received from amplifier 314 at a specific bit rate. The resulting repeated management wavelength is re-multiplexed back to fiber 204 by multiplexer 504 to be received and analyzed by control jack 200.

Figure 7:
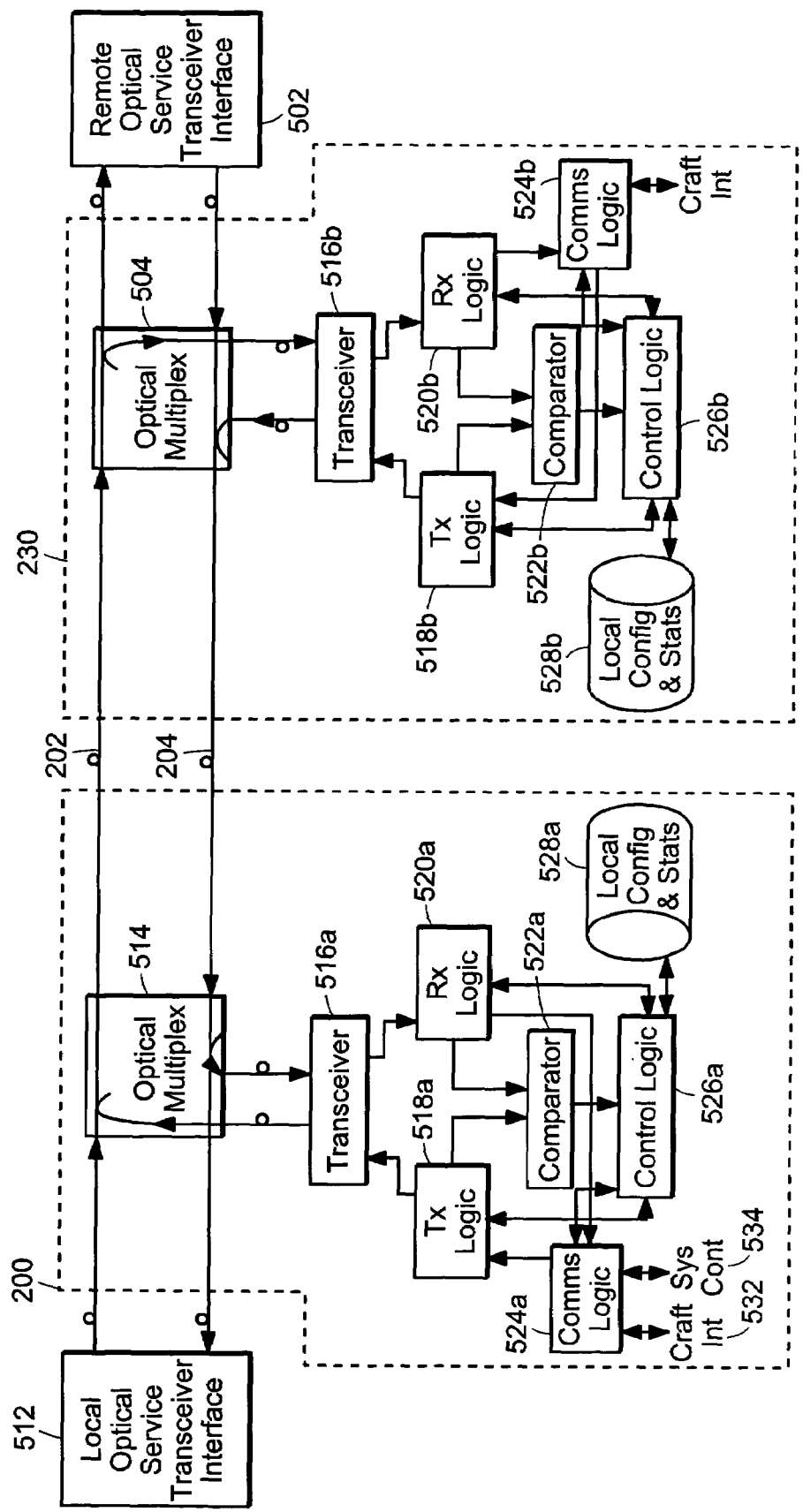
FIG. 7 is a diagram of a two fiber network connection with management and analysis electronics at the demarcation jack.

FIG. 7 is a diagram of a two fiber optical loop network connection with management electronics at the demarcation jack. Such a system may be used, for example, to manage loop and optical path integrity. By combining the functionality of FIG. 4 on both fibers in opposite directions, the optical service transmit and receive paths are monitored individually in each direction with management information analyzed and/or stored by optical jacks at both ends. In addition, the native or analyzed results may be exchanged between the optical jacks via the communications logic 524a and 524b over the communications path embedded in the optical medium management signal. In addition to passing management information upwards in the network hierarchy towards an OSS, this capability may be further used to store copies of management information databases in physically-redundant locations at each end of the facility.

In FIG. 7 and subsequent similar figures, it should be noted that comparators 522a-b do not necessarily compare transmitted protocols with those received. Instead, they may be comparing the received protocols with those that are expected. Information about what protocols are expected may come from earlier instruction, or from a particular standard used or, in fact, from the protocols themselves. In an alternative embodiment of the invention, the payload field in a protocol may contain information about the protocol itself, based on which it may be able to perform OMMS analysis. In another embodiment of the invention, analysis of the protocol may be performed based at least in part on heading and trailing fields of the protocol, which may contain error correction codes. These approaches are particularly useful when the multiplexer and demultiplexer are positioned at opposite ends of the fiber.

The control jack 200 may be located at the service provider's side, as described in connection with FIGS. 5-6, while another optical jack of a similar construction is located at the demarcation point. It will be apparent to one skilled in the art that the demarcation jack may be identical to the control jack in terms of design and functional characteristics. The difference in roles may be indicated by state of control interfaces. For example, control jack 200 may have control interface 534 enabled, indicating that it is to be the controlling end, while the demarcation jack may lack the control interface. In an alternative embodiment of the invention, control and demarcation jacks need not be the same. For example, control jack 200 may be subsystem of a larger, more extensive system than customer-site installed demarcation jack 230. Similarly, the processing and analysis performed at each end need not be the same.

Figure 8:
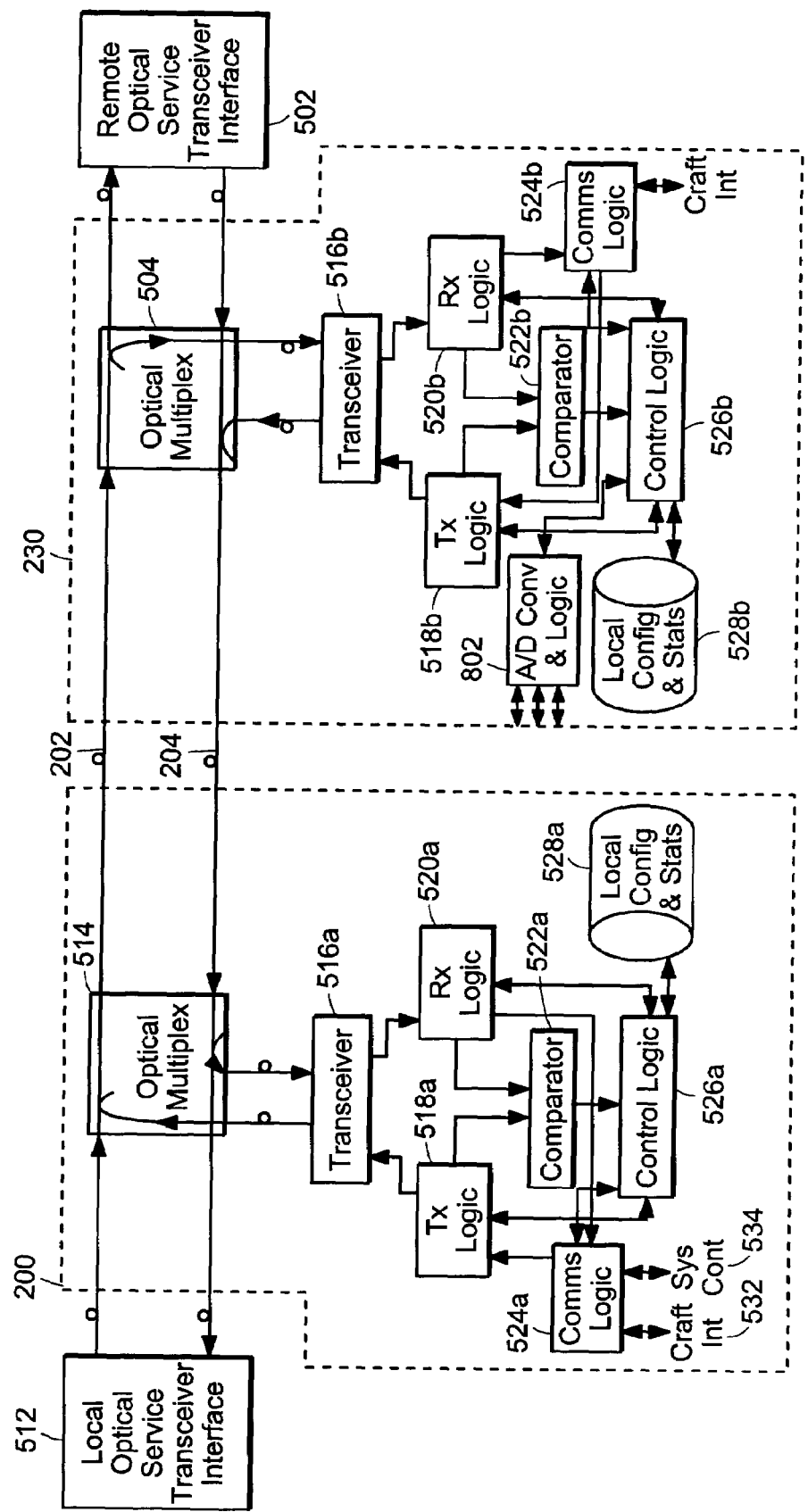
FIG. 8 is a diagram of a two fiber network connection with remote management information interface.

FIG. 8 is a diagram of a two fiber optical loop network connection with remote operational management information interface. The optical jack system of this diagram is very similar to that of FIG. 7, with an addition of customer information management logic 802 at the demarcation jack 230. The customer management information may include any information about a site where the demarcation jack is installed. For example, customer information management logic 802 may be connected to a power system and may be able to encode the state of the power system (on/off, low voltage, etc.) or either control or monitor multiple NC/NO contacts for uses such as remote security or control of remote environmental systems, locally processing and passing management information via the communications facility relative to the various interfaces to the associated control jack 200, or directly to higher order OSS for further processing and action. An alternative embodiment of these capabilities provides similar interfaces on the control jack to centrally emulate transitions or states of the remotely monitored or controlled interfaces. The customer information management logic 802 may also include an analog-to-digital converter, converting analog inputs to digital representation, which can be processed by control logic 526b and then, if needed, be transmitted to another optical jack across the communications path established as part of the optical medium management signal. Such information may be passed directly to the service provider management interface for analysis and diagnostics or further processed by the control jack.

One example of use of such local information is in service provider being able to correlate information from the optical service status and the optical jacks to easily distinguish faults in the fiber connection from power failures on the customer end. The customer information is not limited to power status information—it can include anything and everything, as deemed necessary by one skilled in the art Local information management logic may also pass information in the opposite direction: that is, it may pass control and instructions from the optical jack to other devices either owned or managed by the service providers such as value added service platforms. The terminology of "customer information" does not imply that such a jack may be only located at the customer site: in fact, local information management may be accomplished anywhere the optical jack is installed, be it inside or outside the backbone.

In an alternative embodiment of the invention, there may be more than one potential connection between each pair of optical jacks. For example, in addition to optical connections, there may be a modem or other data communications device connected to the remote craft interface providing remote management access in the event of site isolation. Such a temporary connection will provide access from either NOC personnel or an automated OSS application to the remote optical demarcation jack. By reading or querying the remote control logic and/or database, valuable diagnostic management information can be used to facilitate rapid localization, repair and recovery from site isolation. The variations are many and the system may be adapted by one skilled to the art, depending on a particular implementation.

Figure 9:
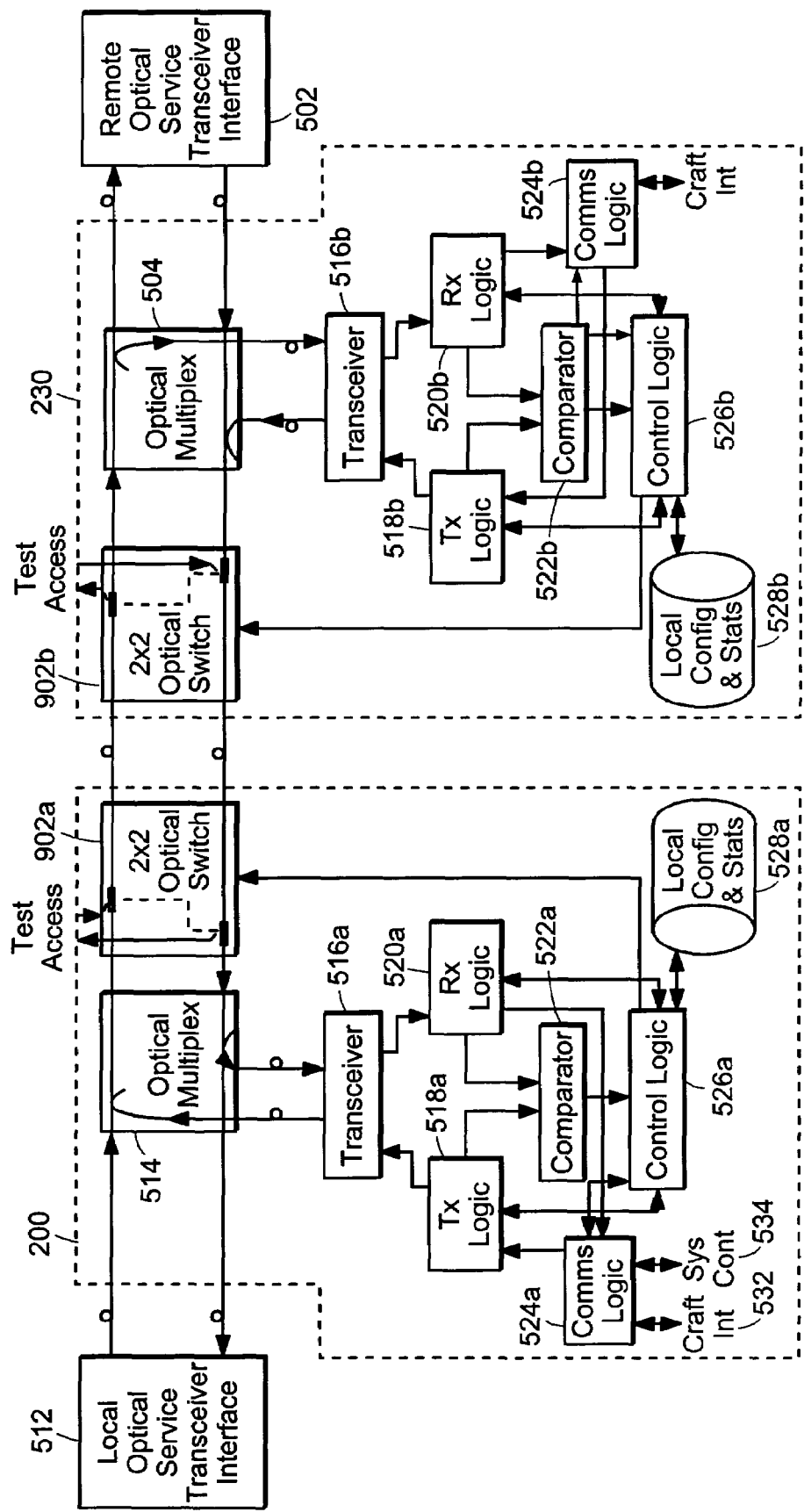
FIG. 9 is a diagram of a two fiber network connection with test access points.

FIG. 9 is a diagram of a two fiber optical loop network connection with managed test access points. This set up is very similar to that discussed in connection with previous figures with the ability to switch the optical medium to external test access points for more comprehensive diagnostic or qualification of the optical medium using optical spectrum analyzers (OSA), optical time division spectrometers (OTDR) or other specialist test or qualification tools available to technicians on site at optical jack locations. Added in this embodiment of the invention is a set of optical switches 902a and 902b to provide test access. Such 2×2 optical switches may be software controlled and may be installed at different points on the fiber loop. When activated under the control of the local control logic, the optical line may be broken out to test optical access ports. When both optical switches are activated, the fiber may be un-terminated at both ends and, hence, suitable for Optical Time Domain Reflectometer (OTDR) access for optical line characterization or diagnostics.

If either one of the switches is opened, while the other is maintained normal, a diagnostic access may be available to primary optical service, and/or OMMS. A message to activate a test access switch may be sent via the communications path from one optical jack to another. Furthermore, the switching information and the result of the test may be stored in a database at either side of the connection.

It may be required that the optical switches be activated for an extended period while testing or characterization is completed. To this end the control logics 526a and 526b may control the switches in a number of different modes; i) as a latching switch where the unit is required to be reset or power cycled to re-establish normal operations; ii) in a non-latching mode wherein the control logic will instruct the switches to return to their normal state after a fixed period of time, say 5 minutes, and; iii) in a extended non-latching mode wherein the period may be programmed under the control of the OSS or a local technician. Depending on a protocol agreed upon between two optical jacks, for each command there may also be a confirming acknowledgement sent back to the originating jack prior to activation of these service disruptive tests.

During testing or during interruption in connection, the optical jacks on opposite ends of the connection may keep logs of the events, and then later, upon reestablishment of the connection, they may synchronize the logs, or analyze them to determine the cause of the interruption.

Figure 10:
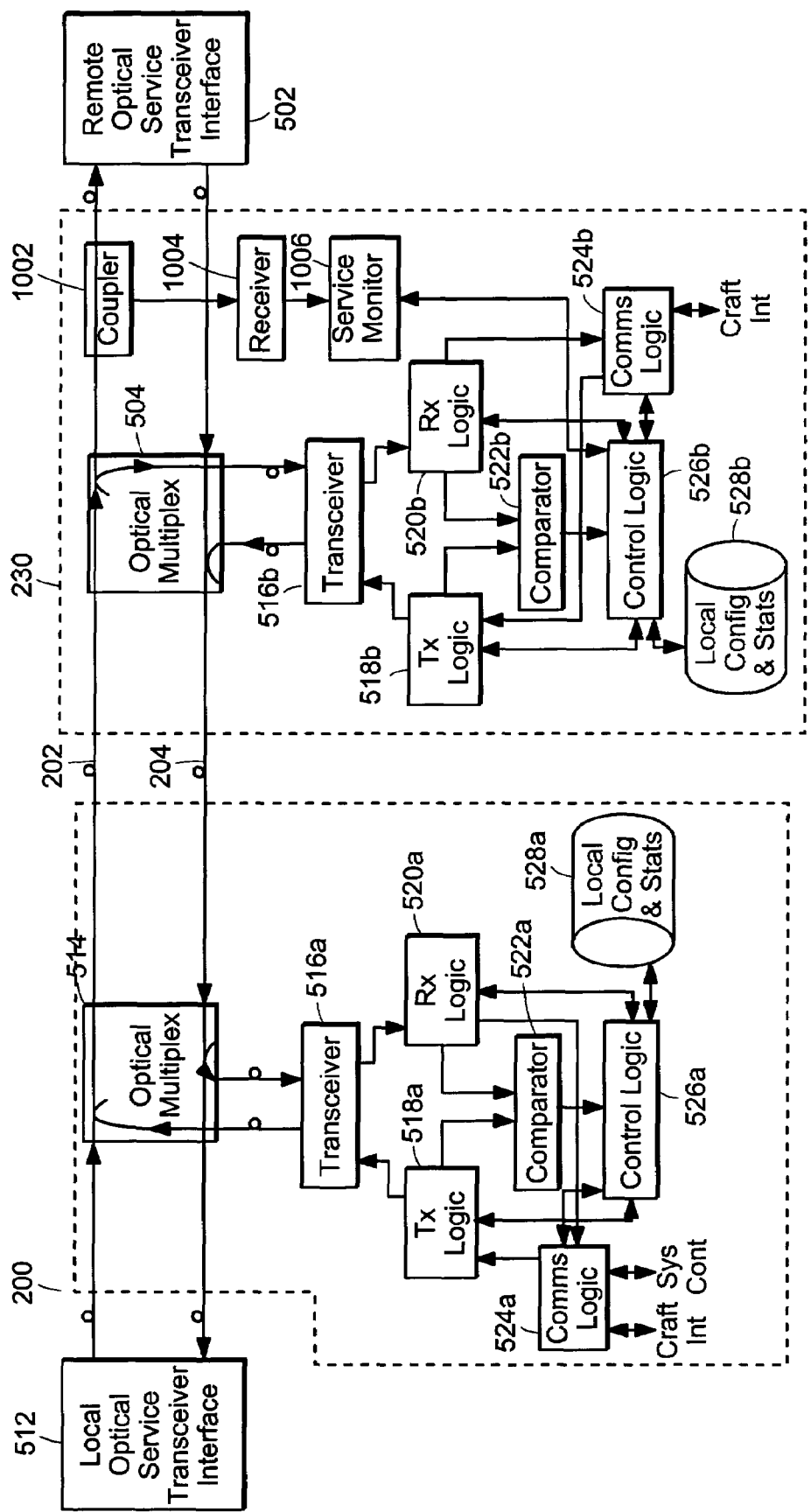
FIG. 10 is a diagram of a two fiber network connection with a service emulator.

FIG. 10 is a diagram of a two fiber optical loop network connection with an optical service monitor.

The demarcation jack 230 includes optical coupler 1002, coupled to fiber 202 with a particular coupling ratio determined as part of the service optical budget design to ensure both the primary service and remote OMMS optical receive power levels are within operational limits. The optical signal extracted by remote coupler 1002 is the primary communication signal on the line and is connected to optical receiver 1004 of suitable sensitivity, which demodulates the received signal from optical to electrical data. Remote service monitor 1006 may be a service specific protocol terminator, such as Gigabit Ethernet, to provide management information such as facility checksum (FCS), loss of signal (LOS) or any other management information as can be determined from the monitored service. In another embodiment the service monitor 1006 may be a configurable network processor, which under the control of the OSS may download, configure to assume the role of a particular protocol terminator, and provide management information for a range of alternative services to be monitored.

In an alternative embodiment the service monitor 1006 may simply monitor the optical power of the optical service, reporting changes or losses to the control logic 526b for further processing and reporting to the OSS.

In an alternative embodiment of the invention, service monitor 1006 may perform security-related functions. In yet another embodiment of the invention, service monitor 1006 may analyze and record service-specific information for billing purposes. The use of service monitor 1006 is not limited to what is described herein, and it can be adapted to deal with any service-specific monitoring function, as determined by one skilled in the art.

In an alternative embodiment of the invention, one of the optical jacks on a loop may perform a service emulator function. A service emulator may be used to reduce the alarm severity of an optical service port where one of the ends of the service is not yet commissioned or there is an interruption in connection for some reason. For example, when an optical line is provisioned, it may happen that the customer does not receive customer-side equipment for some time, while the service provider's side has already been activated. The lack of connection from the customer side may result in a port alarm on the service interface 512 in the providers CO. These alarms, although important in day to day operation indicating failures in connected facilities, are viewed as unimportant while a service is being commissioned. Unfortunately there is no method of determining whether a port alarm is as a result of a failure in a facility or as a result of an un-terminated service at the customer location, typically requiring additional effort to either acknowledge or disable this nuisance alarm. Depending on a particular OSS, diagnosing this predictable alarm may take time and resources from other tasks; therefore, it would be useful to have a way of simulating the connection while the customer side is not active. Service emulator acts as such a simulator, placing the service port in loopback whenever a loss of signal is detected on the incoming fiber 204.

Figure 11:
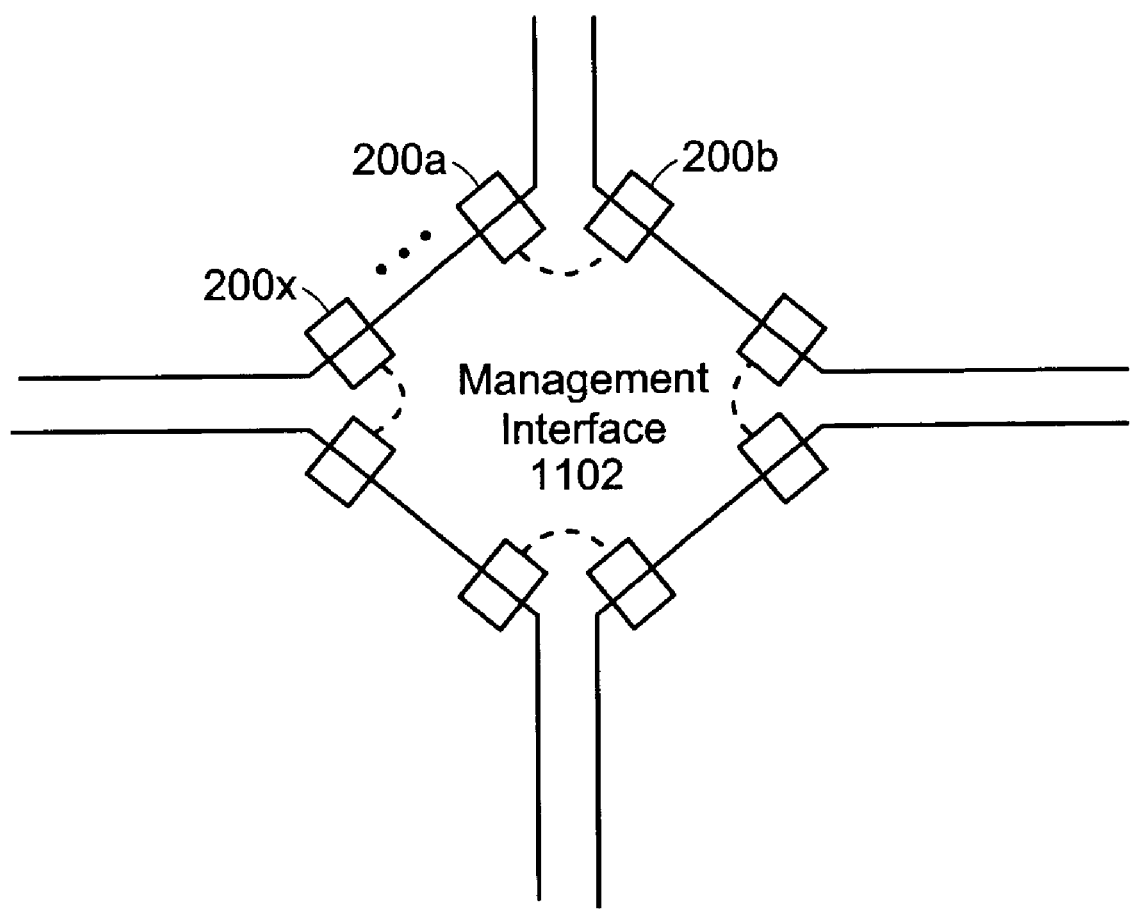
FIG. 11 is a schematic diagram of one network topology.

As discussed above, the use of optical jacks is not limited to customer-service provider connections. They may be implemented inside and outside of the backbone, in any number of network topologies: mesh, complex mesh, spur, extended spur, ring, hub, etc. FIG. 11 is a schematic diagram of one network topology, where optical jacks 200a-x manage different optical connection loops. The optical jacks may be in communication with each other via the intersystem port 426, extending the management and control plane across multiple optical jacks, and also with management interface 1102, reporting to it management information, and receiving instructions and data for transmission to other optical jacks.

In the preferred embodiment, optical jacks to support topologies more complex than simple spurs may be physically combined to provide support for two or more, one or two fiber network spans with consolidated electronic processing collectively supporting all individual connections managed by the optical jack. Furthermore, the jacks may be capable of automatically discovering additional optical jacks on paths connected to a given point, extending the management and control plane, establishing a network of optical jacks that are aware of each other and that can work in a collaborative mode to route traffic and manage optical connections.

Service channels on managed optical connections are not limited to a particular standard or a waveband. For example, they can be in the 850 nm, 1200 nm-1400 nm, 1470 nm-1610 nm, or other wavebands. In one embodiment of the invention, a management wavelength may be selected to fall into a different waveband than data-carrying service wavebands: such a set up eases optical multiplexing and de-multiplexing specifications, and might allow for use of less-precise, and, thus, less expensive components. In an alternative embodiment of the invention, however, the management wavelength may be chosen to fall into the same waveband as the service-carrying wavelength, in order to better diagnose the real conditions experienced by the service-carrying wavelengths in that waveband.

Figure 12:
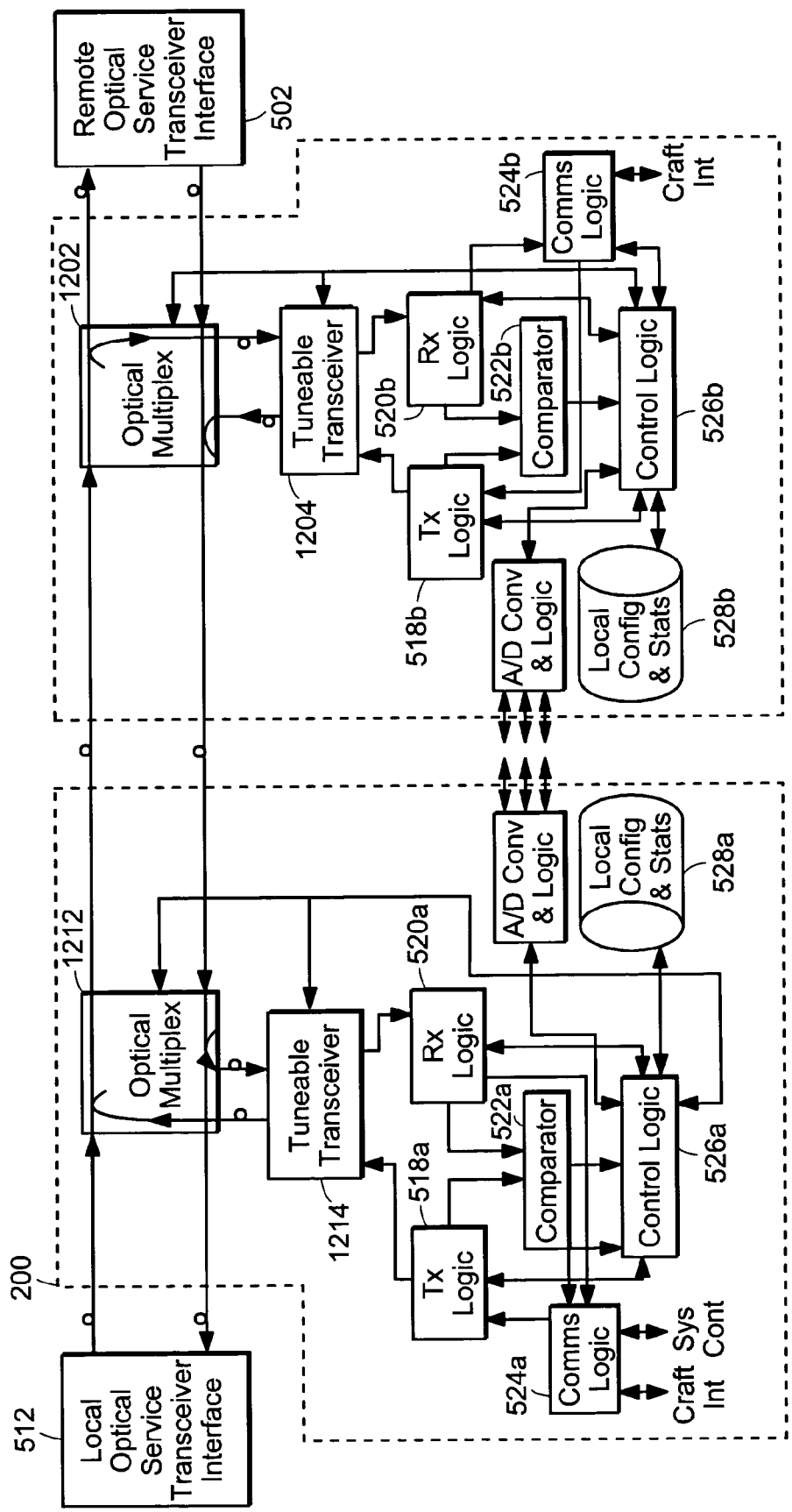
FIG. 12 is a diagram of an optical loop network with tunable optical multiplexers and transceivers.

The management wavelength may be pre-selected prior to a particular optical jack being put into use. Alternatively, it may be set some time during the operation, or even be changed from time to time during the operation of the optical jack. In yet another embodiment of the invention, a management wavelength may be determined automatically during the operation of the optical jack. FIG. 12 is a diagram of optical a two fiber loop network connection with tunable optical components, allowing for dynamic modification of management wavelength.

The tunable optical management wavelength capability is provided through the use of tunable transceivers 1214 and tunable optical multiplexer's 1212a-b. Tunable transceivers 1214a-b and multiplexers 1212a-b may be tuned to a pre-selected wavelength during commissioning of an optical jack, or at maintenance time. Such pre-selected wavelength may be outside of the range of the configured primary service waveband.

The configuration of the tuned management wavelength may be stored in a database as part of the assembly configuration, facilitating recovery of the management wavelength and associated communications following a restart or a failure.

In an alternative embodiment of the invention, optical jacks with tunable transceivers and multiplexers may be further equipped with logic for automatically picking a particular wavelength to use as a management wavelength. Furthermore, such wavelength may be changed based on instructions from another optical jack, or based on local conditions.

An application of tunable management wavelengths may be in ensuring proper service for service-carrying wavelengths: for example, if the signal seems to go through on some channels, but not on others, tunable optical jacks may be able to set management wavelength to one of the faulty channels or nearby channels and test various configurations to determine the point of failure. In yet another embodiment of the invention, the management wavelength may be changed in case of a severe degradation of service in a particular waveband, to deliver a warning of failure to the management operations.

Figure 13A:
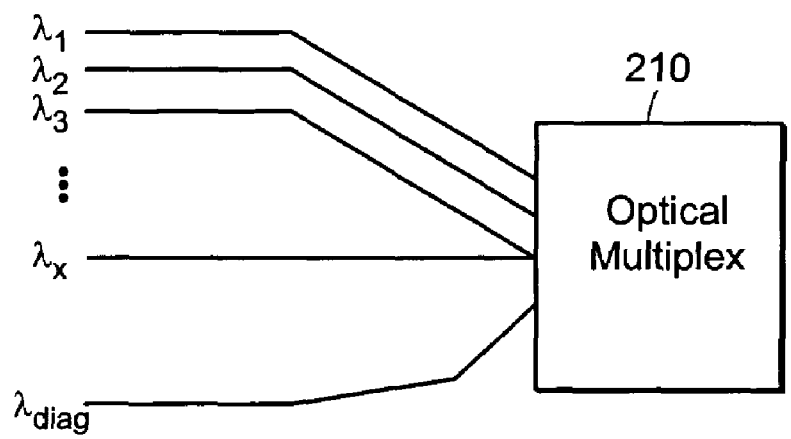
FIGS. 13a-13b are schematic representations of wave division multiplexing.
Figure 13B:
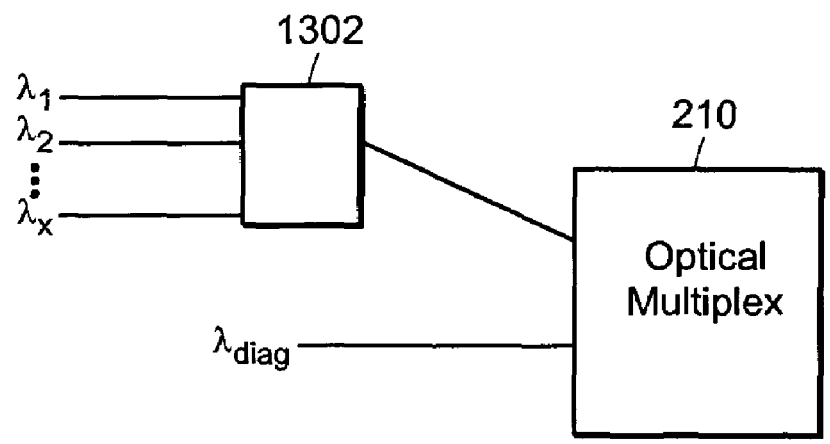

It may be noted that a great number of wavelengths may be multiplexed onto a single fiber, thus increasing carrying capacity. FIGS. 13a-13b are schematic representations of wave division multiplexing. Optical multiplexer 210 may not only multiplex the OMMS onto the fiber, but also multiplex service-carrying wavelengths onto the same fiber, as shown in FIG. 13a. In another embodiment of the invention, service-carrying wavelengths may already be multiplexed together by a separate multiplexer 1302, and optical multiplexer 210 inside optical jack 200 may only need to multiplex the OMMS onto the already-WDM-multiplexed connection, as shown in FIG. 13b.

In yet another embodiment of the invention, there may be more than one optical medium management signals. Different signals may be separated based on functionality, or based on their wavelengths falling into different wavebands. By providing multiple management wavelengths, an optical jack system may provide additional management, services and monitoring capabilities, as determined by one skilled in the art.

Figure 14:
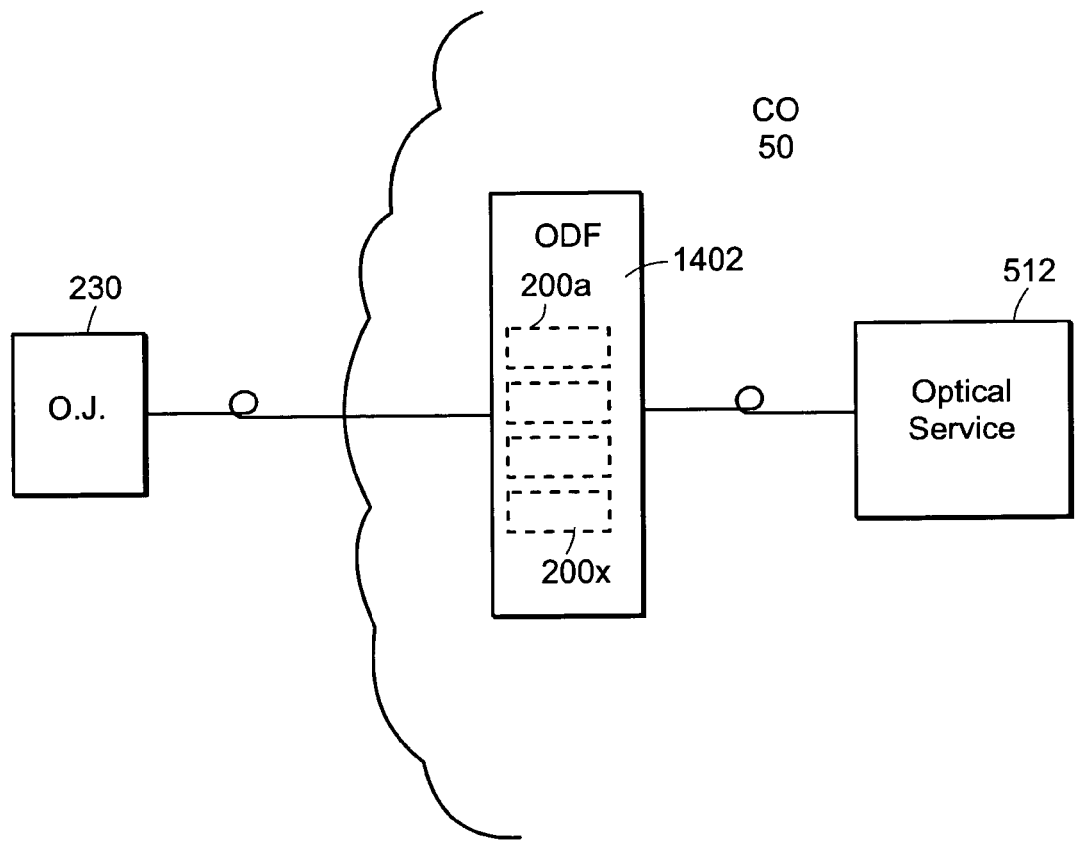
FIG. 14 is a diagram of an optical jack networking system.

Optical jack systems may be used as part of central office operations, providing management of customer accesses and connections to other central offices. FIG. 14 is a diagram of an optical jack networking system. Patch panel optical distribution frame (ODF) 1402, one or more of which, provide interconnection points between the optical service interface and the fiber distribution external plant (Cable Head End) to customer sites, may be made up, for example, of multiple optical jacks 200a-x mounted in a high density system and corresponding management mechanisms, managing connections to demarcation jacks 230a-x. In this preferred embodiment such a system would be the initial ODF/patch panel adjacent to the optical service interface, connected to the port by a short patch cord. In such a way, optical service provider 512 may be able to manage various connections, using technology similar in form factor to what is currently existing while extending the management visibility of the optical media 202 and 204 from the optical interface 512 across and through any other interconnection frames all the way to the remote optical demarcation jack 230. As will be recognized by one skilled in the art, optical jacks in such a set up may be implemented as cards that can be inserted into racks making up an ODF. As connections are added, additional cards may be inserted into rack slots, creating a modular optical management system.

An alternative embodiment may consist of the control jack 200 being a subsystem embedded in the optical service interface port 512 with the management and control plane tightly integrated into the operating system of the major system.

While this invention has been particularly shown and described with references to preferred embodiments thereof, it will be understood by those skilled in the art that various changes in form and details may be made therein without departing from the scope of the invention encompassed by the appended claims.

What is claimed is:

1. A telecommunications system having service provider equipment delivering an optical service, via an optical medium, to a demarcation point to which customer line equipment is connected, a service provider being responsible for the service provider equipment and a optical medium as to the demarcation point, the system comprising:
    an operational support system; and
    a service provider system comprising:
        an optical medium between the service provider equipment and the demarcation point, the service provider equipment providing service signals of one or more optical wavelengths on the optical medium to the demarcation point;
        a transmitter on the service provider side of the demarcation point that provides a management signal on a wavelength separate from the service wavelengths, the management signal formatted with an optical line protocol;
        an optical multiplexer on the service provider side of the demarcation point which multiplexes the management signal onto the optical medium;
        an optical demultiplexer on the service provider side of the demarcation point which demultiplexes the management signal after the management signal has passed through the optical medium; and
        electronics on the service provider side of the demarcation point that process the demultiplexed management signal and provide management information to the operational support system, in a format native to the operational support system, the management information indicating a state of the
    optical medium independent of a state of the customer line equipment.

2. The telecommunications system of claim 1, wherein the optical line protocol is structured for error detection.

3. The telecommunications system of claim 2, wherein changes in error rates indicate changes in state of the optical medium.

4. The telecommunications system of claim 1, wherein the optical line protocol is data structured to have at least one monitoring overhead field and at least one payload field.

5. The telecommunications system of claim 4, wherein the optical line protocol is structured for error correction.

6. The telecommunications system of claim 5, wherein the payload field carries control information.

7. The telecommunications system of claim 5, wherein the payload field carries customer location information.

8. The telecommunications system of claim 1, wherein the optical line protocol is SONET/SDH.

9. The telecommunications system of claim 1, wherein the management information is stored in a database.

10. The telecommunications system of claim 9, wherein the management information is analyzed over time.

11. The telecommunications system of claim 9, wherein the management information is used to predict time until failure of the optical medium.

12. The telecommunications system of claim 1, wherein the optical medium is part of a network topology.

13. The telecommunications system of claim 12, wherein management signs are transferred in opposite direction between nodes, each node transferring, in a management signal, management information based on a management signal from another node.

14. The telecommunications system of claim 1, wherein the optical medium comprises transmit and receive paths with the optical multiplexer and the optical demultiplexer located at the same end of the optical medium.

15. The telecommunications system of claim 1, wherein the optical multiplexer and the optical demultiplexer are located at different ends of the optical medium.

16. The telecommunications system of claim 1, wherein the management signal travels in the opposite direction to the service signal.

17. The telecommunications system of claim 1, wherein the management signal is sensitive to changes in state of the optical medium compared to each service signals.

18. The telecommunications system of claim 17, wherein the management signal is operated at a sensitivity level chosen so as to result in errors in the demultiplexed management signal.

19. The telecommunications system of claim 18, wherein the optical line protocol is structured for error correction.

20. The telecommunications system of claim 17, wherein the management signal is lower in power than the service signals.

21. The telecommunications system of claim 17, wherein power of the management signal is varied over time.

22. The telecommunications system of claim 1, further comprising a tunable transceiver to produce the management signal, wherein the multiplexer is a tunable multiplexer.

23. The telecommunications system of claim 1, wherein the management signal is maintained continuously.

24. A customer access from a telecommunications network having service provider equipment delivering an optical service, via an optical medium, to a demarcation point to which customer line equipment is connected, a service provider being responsible for the service provider equipment and optical medium up to the demarcation point, the access comprising:
- an optical medium at an edge of the network between the service provider equipment and the demarcation point the service provider equipment providing customer service signals of one or more optical wavelengths on the optical medium to the demarcarion point;
- a transmitter on the service provider side of the demarcation point that provides a management signal on a wavelength separate from the service wavelengths, the management signal formatted with an optical line protocol structured to have at least one error detection overhead field and at least one payload field;
- an optical multiplexer on the service provider side of the demarcation point which multiplexes the management signal onto the optical medium;
- an optical demultiplexer of the service provider side of the demarcation point which demultiplexes the management signal after the management signal has passed through the optical medium; and
- electronics on the service provider side of the demarcation point that process the demultiplexed management signal and provide management information to an operational support system in a format native to the operational support system, the management information indicating a state of the optical medium independent of a state of the customer line equipment.

25. The customer access of claim 24, wherein the management signal is sensitive to changes in rare of the optical medium compared to the service signals.

26. The customer access of claim 24, wherein the management signal is operated at a sensitivity level chosen to result in errors in the demultiplexed management signal.

27. A method of providing management information about an optical medium in a telecommunications system having service provider equipment delivering an optical service, via aaaprical medium, to a demarcation point to which customer line equipment is connected, a service provider being responsible for the service provider equipment and optical medium up to the demarcation point, the method comprising:
- providing optical service signals of one or more wavelengths on the optical medium between the service provider equipment and the demarcation point;
- multiplexing, on the service provider side of the demarcation point, a management signal of a wavelength separate from the service wavelengths, the management signal formatted with an optical line protocol;
- demultiplexing, on the service provider side of the demarcation point, the management signal after the management has passed through the optical medium;
- processing, on the service provider side of the demarcation point, the demultiplexed management signal; and
- providing, on the service provider side of the demarcation point, management information to an operational support system in a format native to the operational support system, the management information indicating a state of the optical medium independent of a state of the customer line equipment.

28. The method of claim 27, wherein the optical line protocol is structured for error detection, further comprising detecting errors in the demultiplexed management signal.

29. The method of claim 28, further comprising inferring change in state of the optical medium from changes in error rates.

30. The method of claim 27, wherein the optical line protocol is data structured to have at least one monitoring overhead field and at least one payload field.

31. The method of claim 30, wherein the optical line protocol is structured for error correction.

32. The method of claim 31, further comprising encoding control intimation into the payload field.

33. The method of claim 31, further comprising encoding customer location information into the payload field.

34. The method of claim 27, wherein the optical line protocol is SONET/SDH.

35. The method of claim 27, further comprising storing the management information in a database.

36. The method of claim 35, further comprising analyzing the management information over time.

37. The method of claim 35, further comprising predicting time until failure of the optical medium using the management information.

38. The method of claim 27, wherein the optical medium is part of a network topology.

39. The method of claim 38, further comprising transferring management signals in opposite direction between nodes, each node transferring, in a management signal, management information based on a management signal from another node.

40. The method of claim 27, wherein the optical medium comprises transmit and receive paths with the multiplexing and the demultiplexing performed at the same end of the optical medium.

41. The method of claim 27, wherein the multiplexing and the demultiplexing are performed at different ends of the optical medium.

42. The method of claim 27, further comprising sending the management signal in the opposite direction to the service signals.

43. The method of claim 27, wherein the management signal is sensitive to changes in state of the optical medium compared to each service signals.

44. The method of claim 43, further comprising operating the management signal at a sensitivity level chosen so as to result in errors in the demultiplexed management signal.

45. The method of claim 44, further comprising structuring the optical line protocol for error correction.

46. The method of claim 43, wherein the management signal is lower in power than the service signals.

47. The method of claim 43, further comprising varying power of the management signal over time.

48. The method of claim 27, further comprising tuning a transceiver and multiplexer to produce the management signal.

49. The method of claim 27, further comprising maintaining the management signal continuously.

50. An optical jack for providing management information relative to an optical medium carrying service signals of one or more wavelengths, the jack comprising:
- an optical transmitter modulating a management signal at a wavelength distinct from the service wavelengths, wherein the management signal is formatted with an optical line protocol structured for error detection;

an optical multiplexer which multiplexes the transmitted management signal onto the optical medium;

an optical demultiplexer which demultiplexes a received management signal after the management signal has passed through the optical medium;

an optical receiver demodulating the received management signal; and electronics that process the demodulated received management signal to provide management information relative to the optical medium using error rates in the received management signal;

wherein the optical line protocol is structured to comprise at least one payload field and at least one overhead monitoring field; and wherein the payload field comprises control information for a second optical jack.

51. An apparatus for providing management information about an optical medium in a telecommunications system having service provider equipment delivering an service via an optical medium to a emanation mt to which customer line equipment is connected, a service provider being responsible for the service provider equipment and oprisal medium up to the demarcation point, the apparatus comprising:

means for providing optical service signals of one or more wavelengths on the optical medium between service provider epuinment and the demarcation point;

means for multiplexing, on the service provider side of the demarcation point, a management signal of a wavelength separate from the service wavelengths, the management signal formatted with an optical line protocol;

means for demultiplexing on the service provider side of the demarcation point, the management signal after the management signal has passed through the optical. medium;

means for processing, on the service provider side of the demarcation point, the demultiplexed management signal; and means for providing on the service rovider side of the demarcation point, management information to an operational suppon system, in a format native to the operational support system, the management information indicating a state of the optical medium independent of a state of the customer line equipment.

52. A telecommunications system, the system comprising:

optical service providing service signals of one or more optical wavelengths on an optical medium;

a transmitter that provides a management signal on a wavelength separate from the service wavelengths, the management signal formatted with a data-structured optical line protocol, where the management signal is more sensitive than the service signals to changes itt state of the optical medium;

an optical multiplexer which multiplexes the management signal onto the optical medium;

an optical demultiplexer which multiplexes the management signal after the management signal has passed through the optical medium; and electromcs that process the demultiplexed management signal to provide management information through error detection;

wherein the power of the management signal is varied over time and wherein error rates ax different power levels are stored in a database.

53. A method of providing management information about an optical medium, the method comprising:

providing optical service signals of one or more wavelengths on the optical medium;

multiplexing a management signal of a wavelength separate from the service wavelengths, the management signal formatted with an optical line protocol structured for error detection, wherein the management signal is sensitive to changes in a state of the optical medium as compared to the service signals;

demultiplexing the management signal after the signal has passed through the optical medium;

processing the demultiplexed management signal;

generating management information using detected errors in the demultiplcxed management signal;

varying power level of the management signal over time; and storing information about error rates at different power levels in a database.

* * * * *

UNITED STATES PATENT AND TRADEMARK OFFICE
CERTIFICATE OF CORRECTION

PATENT NO. : 7,394,981 B2
APPLICATION NO. : 10/400164
DATED : July 1, 2008
INVENTOR(S) : Robert H. Manifold It is certified that error appears in the above-identified patent and that said Letters Patent is hereby corrected as shown below:

In Column 17, line 51, delete the word "a";

In Column 17, line 51, replace "as" with --up--;

In Column 18, line 39, replace "signs" with --signals--;

In Column 18, line 53, replace "signal" with --signals--;

In Column 19, line 17, replace "demarcarion" with --demarcation--;

In Column 19, line 28, replace "demultiplexer of" with --demultiplexer on--;

In Column 19, line 40, replace "rare" with --state--;

In Column 19, line 48, replace "aaaprical" with --an optical--;

In Column 19, line 61-62, replace "management has" with --management signal has--;

In Column 20, line 16, replace "intimation" with --information--;

In Column 21, line 20, replace "an service" with --an optical service,--;

In Column 21, line 21, replace "medium" with --medium,--;

In Column 21, line 21, replace "emanation mt" with --demarcation point--;

In Column 21, line 23, replace "oprisal" with --optical--;

In Column 21, line 27, replace "epuinment" with --equipment--;

In Column 21, line 32, replace "demultiplexing" wih --demultiplexing,--;

In Column 21, line 34, replace "optical." with --optical--;

In Column 21, line 39, replace "providing" with --providing,--;

In Column 21, line 39, replace "rovider" with --provider--;

UNITED STATES PATENT AND TRADEMARK OFFICE
CERTIFICATE OF CORRECTION

PATENT NO.          : 7,394,981 B2
APPLICATION NO.  : 10/400164
DATED                    : July 1, 2008
INVENTOR(S)          : Robert H. Manifold It is certified that error appears in the above-identified patent and that said Letters Patent is hereby corrected as shown below:

In Column 21, line 41, replace "suppon" with --support--;

In Column 22, line 10, replace "itt" with --in--;

In Column 22, line 17, replace "electromcs" with --electronics--;

In Column 22, line 21, replace "time" with --time,--;

In Column 22, line 21, replace "ax" with --at--;

In Column 22, line 37, replace "demultiplcxed" with --demultiplexed,--;

Signed and Sealed this

Thirtieth Day of September, 2008

JON W. DUDAS
*Director of the United States Patent and Trademark Office*